(12) United States Patent
Sugio et al.

(10) Patent No.: US 10,271,082 B2
(45) Date of Patent: Apr. 23, 2019

(54) VIDEO DISTRIBUTION METHOD, VIDEO RECEPTION METHOD, SERVER, TERMINAL APPARATUS, AND VIDEO DISTRIBUTION SYSTEM

(71) Applicant: Panasonic Intellectual Property Management Co., Ltd., Osaka (JP)

(72) Inventors: Toshiyasu Sugio, Osaka (JP); Youji Shibahara, Tokyo (JP); Yuki Maruyama, Osaka (JP); Toru Matsunobu, Osaka (JP); Yoichi Sugino, Tokyo (JP); Mikihiro Ouchi, Osaka (JP); Hisao Sasai, Osaka (JP); Kuniaki Isogai, Tokyo (JP); Ryuji Muta, Kanagawa (JP); Takako Hori, Kanagawa (JP); Tomoaki Itoh, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/285,736

(22) Filed: Oct. 5, 2016

(65) Prior Publication Data

US 2017/0026680 A1 Jan. 26, 2017

Related U.S. Application Data

(63) Continuation of application No. PCT/JP2015/001655, filed on Mar. 24, 2015.
(Continued)

(30) Foreign Application Priority Data

Apr. 14, 2014 (JP) .................................. 2014-082774
Mar. 6, 2015 (JP) .................................. 2015-045352

(51) Int. Cl.
*H04N 21/262* (2011.01)
*H04N 21/218* (2011.01)
(Continued)

(52) U.S. Cl.
CPC ........... *H04N 21/262* (2013.01); *H04N 7/181* (2013.01); *H04N 21/2187* (2013.01);
(Continued)

(58) Field of Classification Search
None
See application file for complete search history.

(56) References Cited

U.S. PATENT DOCUMENTS 8,693,848 B1 * 4/2014 Pacor ............... H04N 21/21805
386/296
2004/0111741 A1 * 6/2004 DePietro .................. H04N 5/50
725/34
(Continued)

FOREIGN PATENT DOCUMENTS

JP 10-322680 12/1998
JP 2001-167180 A 6/2001
(Continued)

OTHER PUBLICATIONS

The Extended European Search Report dated Jan. 10, 2017 for the related European Patent Application No. 15779927.1.
(Continued)

*Primary Examiner* — Omar S Parra
(74) *Attorney, Agent, or Firm* — Greenblum & Bernstein, P.L.C.

(57) ABSTRACT

A video distribution method is a video distribution method to be performed by a server that distributes a plurality of videos captured by a plurality of users from different viewpoints to a terminal apparatus. The video distribution method includes distributing, from a server to a terminal
(Continued)

apparatus, a first video that is one of a plurality of videos captured by a plurality of users from different viewpoints and that is requested by the terminal apparatus, selecting a second video that is one of the plurality of videos and that is likely to be next requested next time by the terminal apparatus, and starting transmission of the second video to the terminal apparatus during distribution of the first video to the terminal apparatus.

21 Claims, 18 Drawing Sheets

Related U.S. Application Data

(60) Provisional application No. 62/015,601, filed on Jun. 23, 2014.

(51) Int. Cl.
*H04N 21/2187* (2011.01)
*H04N 21/2665* (2011.01)
*H04N 7/18* (2006.01)
*H04N 21/234* (2011.01)

(52) U.S. Cl.
CPC . *H04N 21/21805* (2013.01); *H04N 21/23418* (2013.01); *H04N 21/2665* (2013.01)

(56) References Cited

U.S. PATENT DOCUMENTS

2011/0093415 A1* 4/2011 Rhee .................. G06F 17/30864
706/12
2017/0180961 A1* 6/2017 Gauglitz ............... H04W 4/206

FOREIGN PATENT DOCUMENTS

| JP | 2008-211417 | 9/2008 |
| JP | 2009-206625 | 9/2009 |
| JP | 2011-135138 | 7/2011 |
| JP | 2011-254181 | 12/2011 |
| JP | 2012-034083 | 2/2012 |
| JP | 2012-048639 A | 3/2012 |
| JP | 2012-094990 | 5/2012 |
| JP | 2013-183209 | 9/2013 |
| JP | 2014-041502 A | 3/2014 |

OTHER PUBLICATIONS

Clifford De Raffaele et al: "Applying Prediction Techniques to Reduce Uplink Transmission and Energy Requirements in Mobile Free-Viewpoint Video Applications", Advances in Multimedia (MMEDIA), 2010 Second International Conferences on, IEEE, Piscataway, NJ, USA, Jun. 13, 2010 (Jun. 13, 2010), pp. 55-60, XP031702533.
International Search Report of PCT application No. PCT/JP2015/001655 dated Apr. 21, 2015.

* cited by examiner

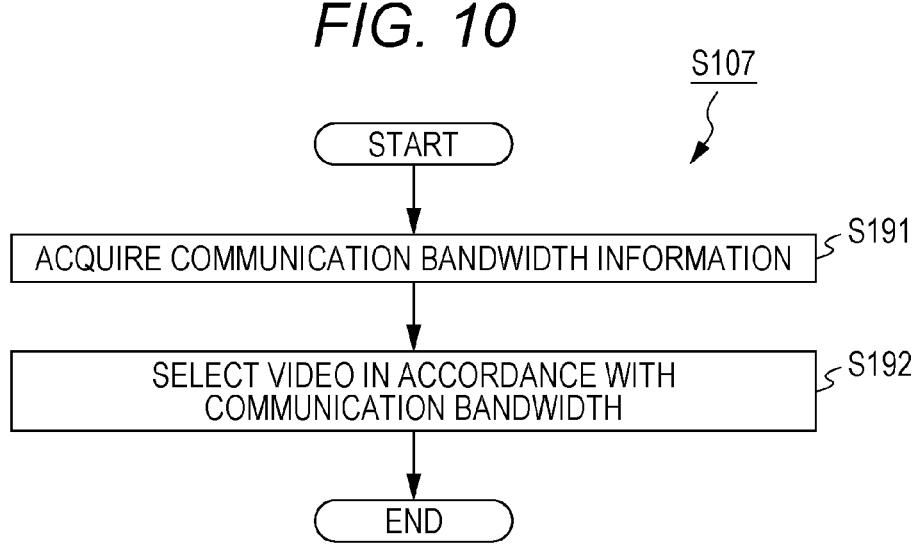
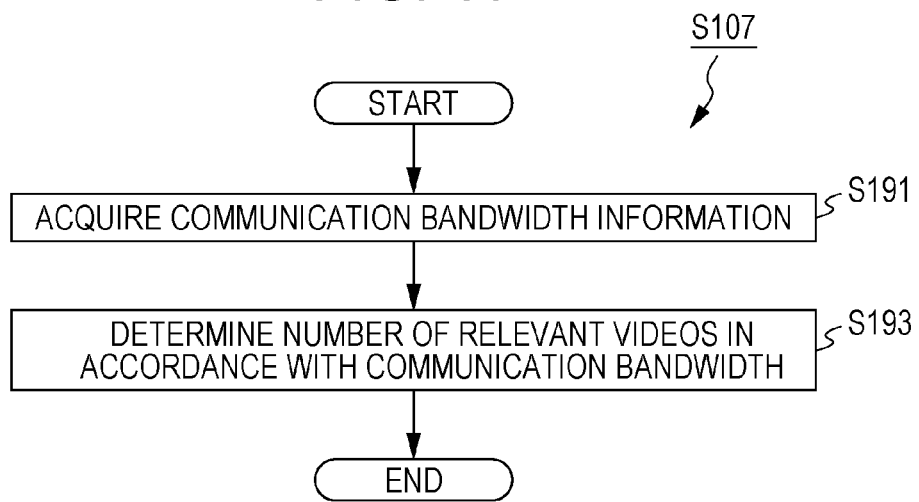

VIDEO DISTRIBUTION METHOD, VIDEO RECEPTION METHOD, SERVER, TERMINAL APPARATUS, AND VIDEO DISTRIBUTION SYSTEM

BACKGROUND

1. Technical Field

The present disclosure relates to a video distribution method and the like that distribute videos captured from a plurality of viewpoints.

2. Description of the Related Art

As a video distribution method, for example, a technology described in PTL 1 is known. Moreover, a video distribution method for distributing videos captured from a plurality of viewpoints is known (for example, refer to PTL 2). Such video distribution methods enable a user to specify and view any video from a plurality of videos of a specific scene captured from different viewpoints.

CITATION LIST

Patent Literatures

PTL 1: Unexamined Japanese Patent Publication No. 2009-206625
PTL 2: Unexamined Japanese Patent Publication No. 2012-094990

It has been desired that such video distribution methods enable smooth switching of videos.

SUMMARY

One non-limiting and exemplary embodiment provides a video distribution method or a video reception method that enables smooth switching of videos.

In one general aspect, the techniques disclosed here feature a method including a distribution step of distributing a first video that is one of a plurality of videos captured by a plurality of users from different viewpoints and that is requested by a terminal apparatus, from a server to the terminal apparatus, a selection step of selecting a second video that is one of the plurality of videos and that is highly likely to be requested next time by the terminal apparatus, and a transmission step of starting transmission of the second video to the terminal apparatus during distribution of the first video to the terminal apparatus.

The present disclosure can provide the video distribution method or video reception method that enables smooth switching of videos.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF THE DRAWINGS

FIG. 10 is a diagram illustrating an example of the relevant video selection processing according to the first exemplary embodiment;

FIG. 11 is a diagram illustrating an example of the relevant video selection processing according to the first exemplary embodiment;

Figure 1:
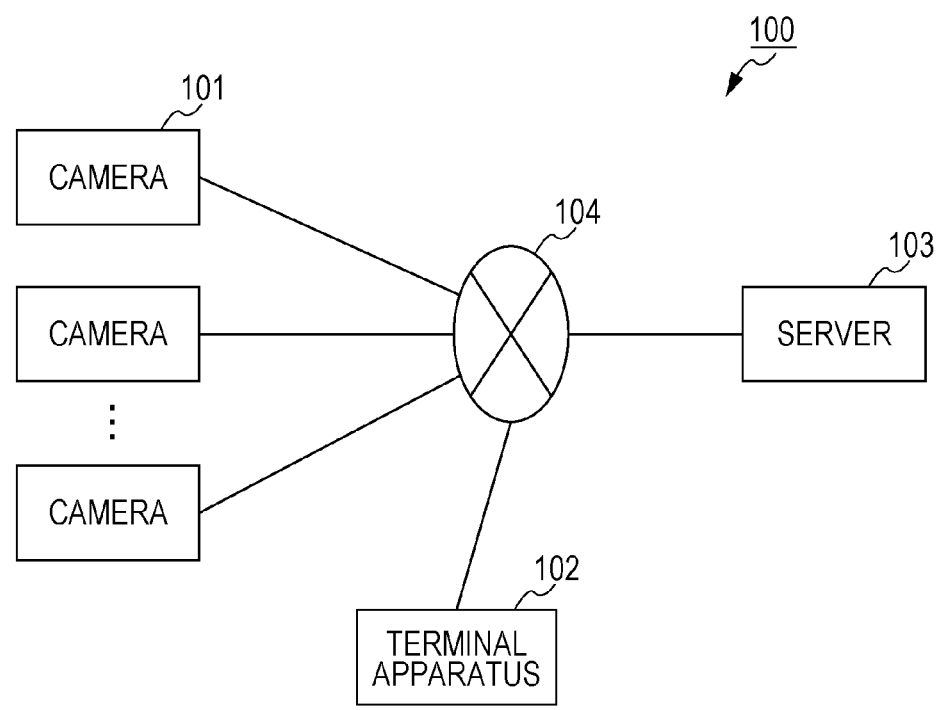
FIG. 1 is a diagram illustrating a configuration of a video distribution system according to a first exemplary embodiment.

DETAILED DESCRIPTION (Underlying Finding of Present disclosure)

In distribution of a plurality of videos of different viewpoints, a user selects the videos to be viewed, and the selected videos are distributed from a server to a terminal apparatus. This is likely to produce waiting time after the user selects the videos until the videos are displayed. Note that it is difficult to transmit all the videos to the terminal apparatus in advance because a communication band has limitations.

Meanwhile, PTL 1 discloses a method for sending a large image including surroundings of a viewed image. Moreover, PTL 2 discloses a method for distributing as a group video viewpoint videos surrounding a displayed viewpoint video among a plurality of videos of different viewpoints.

However, in a case of distributing videos captured by a plurality of users from any viewpoints, it is difficult to perform seamless display by the above-described technology. Specifically, since capturing viewpoints are determined in advance, the above-described technology can determine the group video and the like in advance. Meanwhile, in videos captured by the plurality of users in any manner, capturing conditions such as viewpoints, image quality, and a zoom level are set in any manner. In such a case, it is difficult to seamlessly display videos captured from the viewpoints which the users like.

A video distribution method according to one aspect of the present disclosure is a video distribution method to be performed by a server that distributes any one of a plurality of videos captured by a plurality of users from different viewpoints to a terminal apparatus. The video distribution method includes a distribution step of distributing to the terminal apparatus a first video that is one of the plurality of videos and that is requested by the terminal apparatus, a selection step of selecting a second video that is one of the plurality of videos and that is highly likely to be requested next time by the terminal apparatus, and a transmission step of starting transmission of the second video to the terminal apparatus during distribution of the first video to the terminal apparatus.

Accordingly, the second video is sent to the terminal apparatus in advance during display of the first video. This enables the terminal apparatus to perform smooth switching from the first video to the second video.

For example, in the selection step, each of the plurality of videos with a high degree of relevance to the first video is selected as the second video.

This enables the terminal apparatus to perform smooth switching of the videos when the second video with a high degree of relevance to the currently displayed first video is selected.

For example, in the selection step, the degree of relevance is determined to be higher as a position of a capturing scene is closer to a position of a capturing scene of the first video.

For example, in the selection step, the degree of relevance is further determined to be higher as a size of the capturing scene is closer to a size of the capturing scene of the first video.

For example, in the selection step, the degree of relevance of each of the videos in which a subject identical to a subject in the first video is captured is set high.

For example, in the selection step, the second video is selected based on frame rates, resolution, and bit rates of the plurality of videos.

For example, in the selection step, each of the plurality of videos selected by another user many times is selected as the second video.

For example, in the selection step, the second video is selected based on a viewing history or previously registered taste information of each of the users.

Moreover, a video reception method according to one aspect of the present disclosure is a video reception method to be performed by a terminal apparatus that receives from a server any one of a plurality of videos captured from a plurality of viewpoints and that displays the received video. The video reception method includes a selection step of selecting a first video from the plurality of videos, a request step of requesting the server to transmit the first video, a first reception step of receiving the first video from the server, a display step of displaying the first video, and a second reception step of starting reception of a second video that is one of the plurality of videos and that is highly likely to be selected next time, during reception of the first video.

Accordingly, the terminal apparatus receives the second video in advance during display of the first video. This enables the terminal apparatus to perform smooth switching from the first video to the second video.

For example, the video reception method further includes a step of accumulating the received second video, and a step of displaying the accumulated second video when the second video is selected during display of the first video.

For example, the video reception method further includes a step of receiving from the server a third video different from the first video and the second video when the third video is selected during display of the first video, and a step of displaying the accumulated second video until reception of the third video.

This enables the terminal apparatus to display the second video during waiting time for switching from the first video to another video.

For example, in the display step, an image that overlooks a place in which the plurality of videos is captured and that includes a plurality of icons which indicates positions of the plurality of viewpoints is further displayed.

For example, in the display step, each of the plurality of icons that indicates the position of the viewpoint of the second video is highlighted.

This enables the user to easily select the second video.

Moreover, a server according to one aspect of the present disclosure is a server for distributing to a terminal apparatus one of a plurality of videos captured by a plurality of users from different viewpoints. The server includes a distributer that distributes to the terminal apparatus a first video that is one of the plurality of videos and that is specified by the terminal apparatus, a selector that selects a second video that is one of the plurality of videos and that is highly likely to be requested next time by the terminal apparatus, and a transmitter that starts transmission of the second video to the terminal apparatus during distribution of the first video to the terminal apparatus.

Accordingly, the second video is sent to the terminal apparatus in advance during display of the first video. This enables the terminal apparatus to perform smooth switching from the first video to the second video.

Moreover, a terminal apparatus according to one aspect of the present disclosure is a terminal apparatus for receiving from a server any one of a plurality of videos captured from a plurality of viewpoints and for displaying the received video. The terminal apparatus includes a selector that selects a first video from the plurality of videos, a requester that requests the server to transmit the first video, a first receiver that receives the first video from the server, a display unit that displays the first video, and a second receiver that starts reception of a second video that is one of the plurality of videos and that is highly likely to be selected next time, during reception of the first video.

Accordingly, the terminal apparatus receives the second video in advance during display of the first video. This enables the terminal apparatus to perform smooth switching from the first video to the second video.

Moreover, a video distribution system according to one aspect of the present disclosure includes the server and the terminal apparatus.

Accordingly, the second video is sent to the terminal apparatus in advance during display of the first video. This enables the terminal apparatus to perform smooth switching from the first video to the second video.

Note that these comprehensive or specific aspects may be implemented using a system, a method, an integrated circuit, a computer program, or a computer-readable recording medium such as a CD-ROM, or may be implemented using any combination of a system, a method, an integrated circuit, a computer program, and a recording medium.

Exemplary embodiments will be described specifically below with reference to the drawings. Note that each of the exemplary embodiments described below illustrates a specific example of the present disclosure. Numerical values, shapes, materials, components, arrangement positions and connection forms of the components, steps, order of the steps, and the like described in the following exemplary embodiments are an examples, and do not intend to limit the present disclosure. Moreover, components that are described in the following exemplary embodiments, but that are not described in independent claims which represent the highest concept are described as optional components.

First Exemplary Embodiment

A video distribution system according to the present exemplary embodiment transmits in advance part of a plurality of videos to a terminal apparatus. This enables seamless switching of the videos when the part of videos is selected next time.

First, a configuration of the video distribution system according to the present exemplary embodiment will be described. FIG. 1 is a block diagram illustrating a configuration of video distribution system 100 according to the present exemplary embodiment. Video distribution system 100 includes a plurality of cameras 101, terminal apparatus 102, and server 103, each of which is capable of communicating via network 104.

The plurality of cameras 101 generates a plurality of video signals by capturing an identical scene in an identical time zone from different viewpoints. Cameras 101 are each carried by each of a plurality of users. For example, the plurality of cameras 101 is owned by a plurality of spectators who is in a place such as a sport stadium. The plurality of video signals captured with the plurality of cameras 101 is transmitted to server 103 via network 104. Moreover, these video signals include information that indicates capturing viewpoints (camera positions), directions of the cameras, magnifications, and the like.

Note that cameras 101 may be any device that has at least a capturing function and for example, cameras 101 are digital still cameras, digital camcorders, smartphones, or portable terminals.

Terminal apparatus 102 is a terminal used by each of the users, and has at least a function of displaying videos. For example, terminal apparatus 102 is a smartphone, a portable terminal, or a personal computer. Note that terminal apparatus 102 may have a function similar to a function of cameras 101, and the spectators may include the user. The user may view the videos from a place other than the stadium.

Server 103 keeps the plurality of video signals transmitted from the plurality of cameras 101. Moreover, in response to a request from terminal apparatus 102, server 103 transmits part of the plurality of kept video signals to terminal apparatus 102. Moreover, server 103 analyzes contents of the plurality of video signals, and based on characteristics of the obtained videos, server 103 calculates degrees of relevance of the plurality of video signals. Further, in addition to a selected video signal specified by terminal apparatus 102, server 103 transmits a relevant video signal with a high degree of relevance to the selected video signal to terminal apparatus 102.

Note that the following describes an example in which the plurality of video signals is transmitted in real time from the plurality of cameras 101 and the user views the video signals in real time by using terminal apparatus 102; however, at least one of transmission and viewing of the videos may not be performed in real time. Moreover, transmission and reception of the video signals (videos) described below mainly mean stream transmission and reception in which the video signals are transmitted or received continuously.

Figure 2:
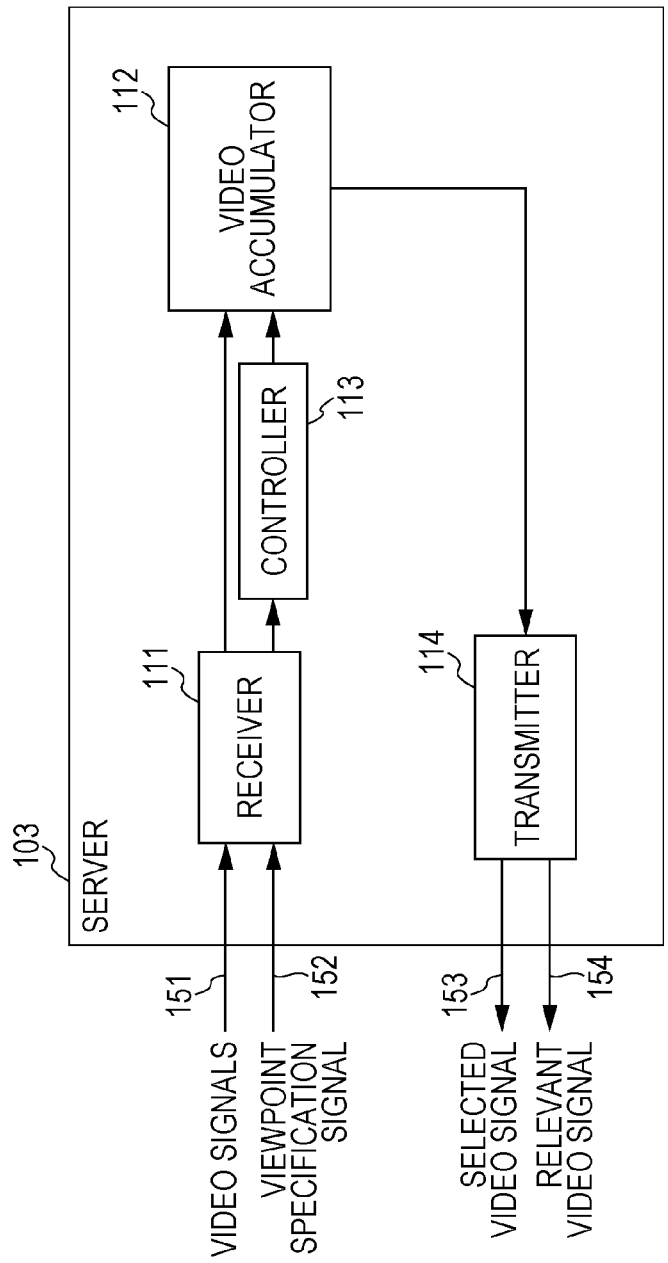
FIG. 2 is a block diagram of a server according to the first exemplary embodiment.

The following describes a configuration of each apparatus. FIG. 2 is a block diagram illustrating a configuration of server 103. Server 103 includes receiver 111, video accumulator 112, controller 113, and transmitter 114.

Receiver 111 receives the plurality of video signals 151 produced by the plurality of cameras 101 capturing an identical scene from different viewpoints. Moreover, receiver 111 receives viewpoint specification signal 152 transmitted from terminal apparatus 102. Viewpoint specification signal 152 specifies any one of the plurality of video signals 151.

Video accumulator 112 accumulates the plurality of video signals 151 received by receiver 111.

Controller 113 selects as selected video signal 153 each of the video signals 151 specified by viewpoint specification signal 152 from the plurality of video signals 151 accumulated in video accumulator 112, and controller 113 transmits selected video signal 153 to terminal apparatus 102 via transmitter 114. Moreover, controller 113 selects relevant video signal 154 relevant to selected video signal 153 from the plurality of video signals 151 accumulated in video accumulator 112, and controller 113 transmits relevant video signal 154 to terminal apparatus 102 via transmitter 114.

Figure 3:
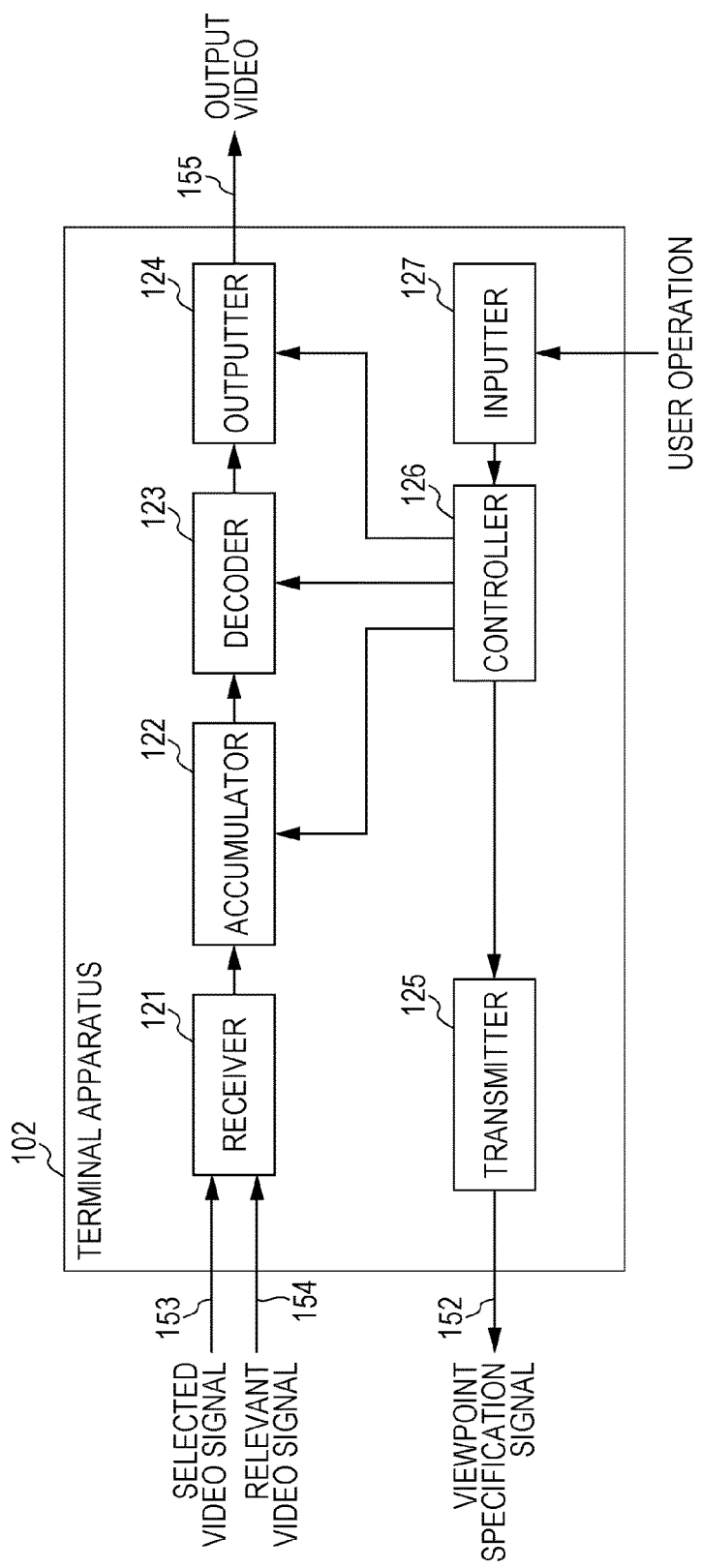
FIG. 3 is a block diagram of a terminal apparatus according to the first exemplary embodiment.

FIG. 3 is a block diagram of terminal apparatus 102. Terminal apparatus 102 includes receiver 121, accumulator 122, decoder 123, outputter 124, transmitter 125, controller 126, and inputter 127.

Receiver 121 receives selected video signal 153 and relevant video signal 154 transmitted from server 103. Accumulator 122 temporarily keeps selected video signal 153 and relevant video signal 154 received by receiver 121.

Decoder 123 generates a decoded video by decoding selected video signal 153. Outputter 124 generates output video 155 including the decoded video, and for example, a display apparatus such as a display in terminal apparatus 102 displays output video 155.

Inputter 127 receives a user operation. For example, inputter 127 receives the user operation on a touch panel in terminal apparatus 102. When inputter 127 receives the operation of viewpoint change made by the user, controller 126 transmits viewpoint specification signal 152 that indicates the changed viewpoint to server 103 via transmitter 125.

Figure 4:
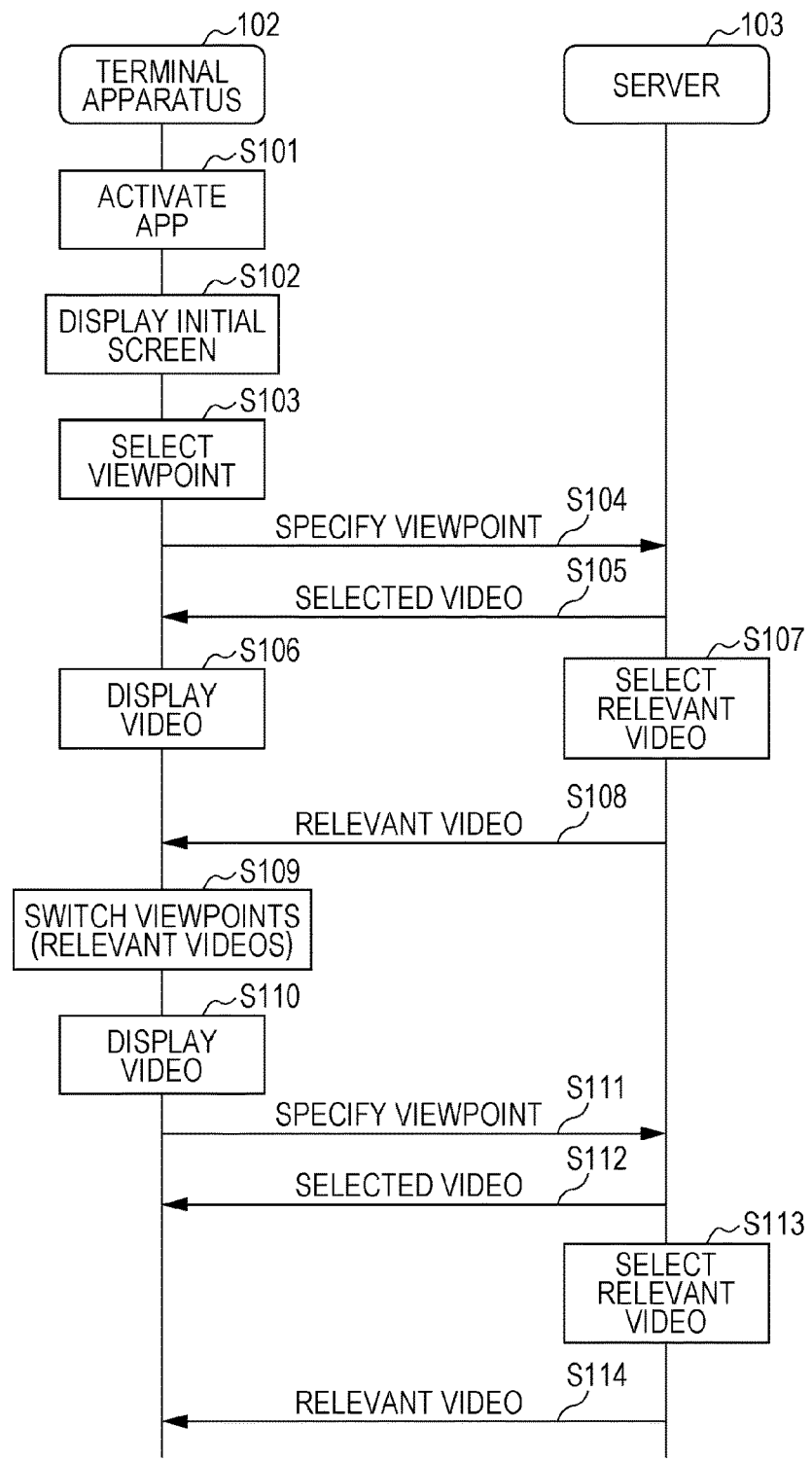
FIG. 4 is a diagram illustrating processing of the video distribution system according to the first exemplary embodiment.

Next, an operation of video distribution system 100 will be described. FIG. 4 is a sequence diagram of video distribution processing in video distribution system 100. Note that in FIG. 4, the plurality of video signals 151 has already been kept in server 103. Note that the plurality of video signals 151 may be videos updated from the plurality of cameras 101 in real time, as in the example of the stadium where the users are spectators in the stadium, or the plurality of video signals 151 may be past videos kept in server 103 in advance.

First, terminal apparatus 102 activates, for example, an application program (app) in response to the user operation (S101). Next, terminal apparatus 102 displays an initial screen (S102). Specifically, terminal apparatus 102 receives from server 103 as initial information, information that indicates positions (viewpoint positions) of the plurality of cameras 101 when the plurality of video signals 151 is captured. Terminal apparatus 102 displays as the initial screen the information that indicates the positions of the plurality of cameras 101.

Figure 5:
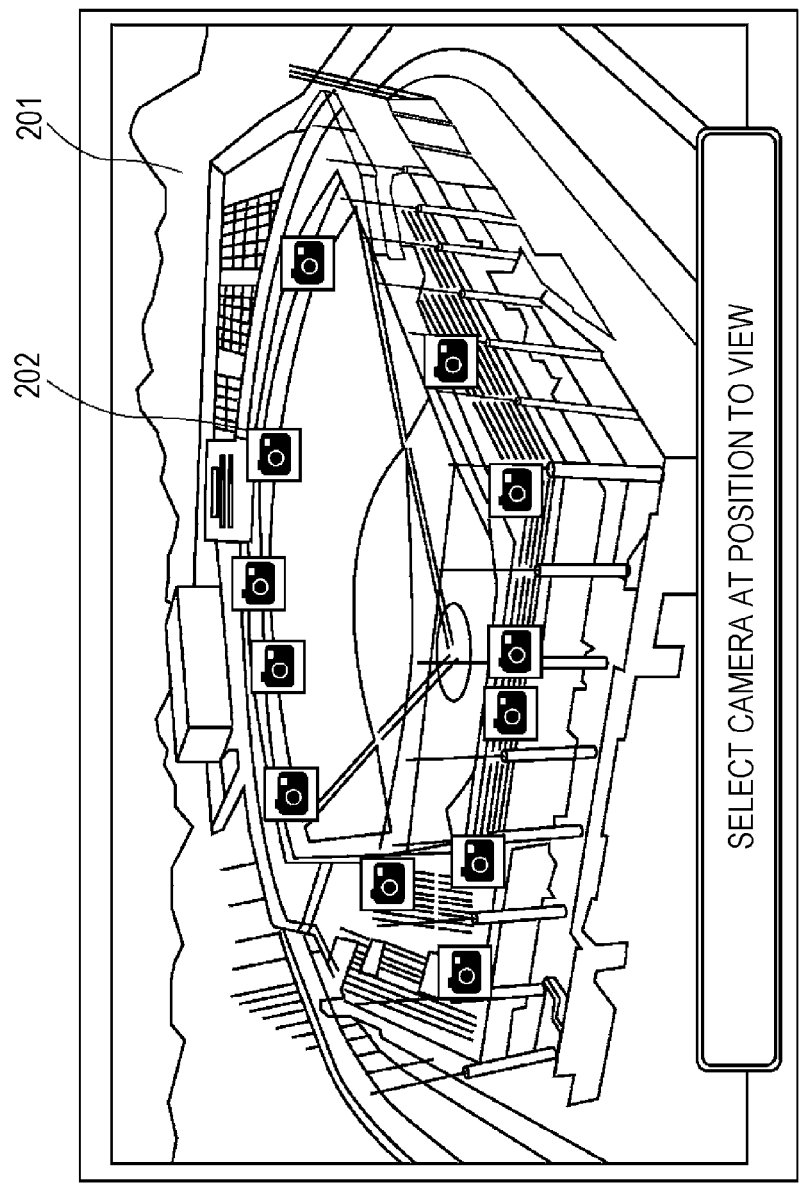
FIG. 5 is a diagram illustrating an example of an initial screen according to the first exemplary embodiment.

FIG. 5 is a diagram illustrating an example of this initial screen. Background image 201 uses an image that overlooks places in which the plurality of videos is captured. Moreover, camera icons 202 that are the viewpoint positions of the viewable videos and that indicate the positions of cameras 101 capturing the viewable videos are displayed on background image 201.

Note that instead of camera icons 202, or in addition to camera icons 202, thumbnails may be displayed. Further, when the initial screen is enlarged, the thumbnails may be displayed instead of camera icons 202.

Moreover, when there are a lot of videos, only camera icon 202 or thumbnail of the video with a high degree of recommendation to users may be displayed based on a degree of relevance described below or the like. Moreover, when the thumbnail is displayed, the thumbnail may be displayed larger than camera icon 202.

Moreover, when there are a lot of videos, the videos with a high degree of relevance may be grouped, and camera icon 202 may be displayed for each group or for each representative video of each group. Here, the representative video is determined, for example, based on characteristics of the videos (resolution, a frame rate, a bit rate or the like). For example, a highest-resolution video, a highest-frame-rate video, or a highest-bit-rate video is determined as the representative video.

Moreover, information that indicates relevant content of each group may be displayed together with camera icon 202. Moreover, a thumbnail of the representative video of each group or a reduced video may be displayed instead of camera icon 202.

Here, the representative video of each group is highly likely to be clicked. For this reason, terminal apparatus 102 may receive the representative video from server 103 in advance. That is, terminal apparatus 102 may receive all the representative videos of the respective groups at time of displaying the initial screen. Alternatively, when a certain group or a certain representative video is selected, terminal apparatus 102 may receive part or all of the videos in the group from server 103.

Moreover, terminal apparatus 102 may set only camera icon 202 corresponding to the video having sufficient data accumulated in accumulator 122 during some time after start of reception to be selectable.

Moreover, terminal apparatus 102 may select the viewpoint to be displayed such that a number of camera icons 202 displayed is constant even when the screen is enlarged or reduced in response to the user operation.

Moreover, background images 201 of the initial screen may be switched depending on the current position of the user. For example, when the user is in an infield stand of the stadium, an image of a scene viewed from the infield stand may be set in background image 201, and when the user is in an outfield stand, an image of a scene viewed from the outfield stand may be set in background image 201.

Moreover, camera icons 202 displayed on the initial screen may be switched according to background image 201. Moreover, camera icons 202 may be switched depending on the user position. For example, when the user is in the infield stand, the image of the scene viewed from the infield stand may be set in background image 201, and camera icons 202 indicating the capturing viewpoints that exist in the scene viewed from the infield stand may be displayed.

At this time, the videos to be received in advance may be switched according to the user position. For example, when the user is in the infield stand, terminal apparatus 102 may receive the video captured from the outfield stand in advance.

Moreover, the initial screens or videos to be received in advance may be switched according to a viewing situation of all the users or part of the users. For example, the video that is being viewed by a lot of users or the video viewed many times in the past may be received preferentially.

Description will be provided again with reference to FIG. 4. When any one of camera icons 202 is selected by the user in the initial screen (S103), terminal apparatus 102 transmits viewpoint specification signal 152 that indicates the selected viewpoint to server 103 (S104).

Server 103 having received viewpoint specification signal 152 starts transmission of selected video signal 153 specified by viewpoint specification signal 152 to terminal apparatus 102 (S105). Terminal apparatus 102 having received selected video signal 153 decodes selected video signal 153, and starts display of the obtained video (S106).

Moreover, server 103 having received viewpoint specification signal 152 selects relevant video signal 154 relevant to selected video signal 153 (S107), and starts transmission of relevant video signal 154 to terminal apparatus 102 (S108). Note that although selection of relevant video signal 154 (S107) is performed here after start of transmission of selected video signal 153 (S105), order of the processing may be any order, and part of the processing may be performed in parallel.

Selection processing of the relevant video (S107) will be described. Server 103 uses at least one of a plurality of methods described below as the selection processing of the relevant video. Moreover, in each of the plurality of methods described below, the degree of relevance of each video is set, and the video with the highest final degree of relevance is selected as the relevant video. Note that the plurality of videos may be selected in decreasing order of priority as the relevant videos.

FIG. 6 to FIG. 11 are flowcharts of this selection processing.

Figure 6:
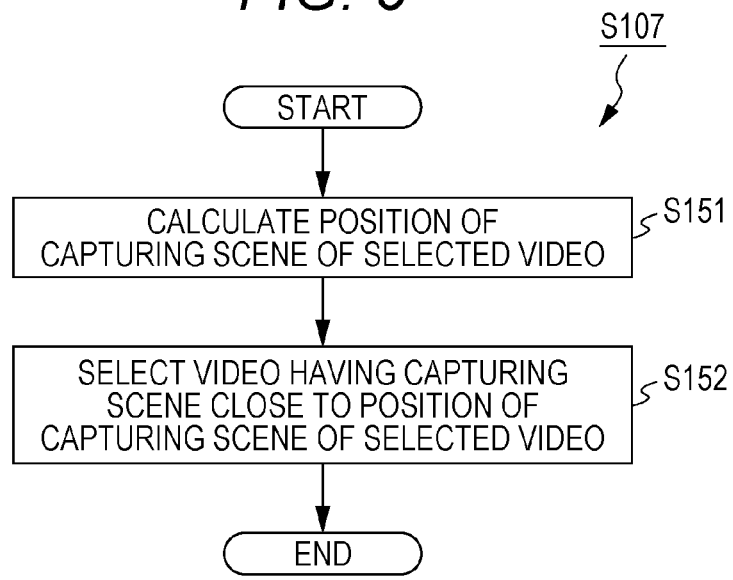
FIG. 6 is a diagram illustrating an example of relevant video selection processing according to the first exemplary embodiment.

In an example illustrated in FIG. 6, server 103 calculates a position of a capturing scene (an area captured in the video) of the selected video (S151), and increases the degree of relevance of the video having the capturing scene close to a position of the capturing scene of the selected video (S152). Specifically, server 103 calculates the position of the capturing scene of each video by using information in video signal 151 transmitted from camera 101. More specifically, video signal 151 includes information such as the viewpoint position at which the video is captured, and a direction and zoom magnification of camera 101. Server 103 uses these pieces of information to calculate the position of the capturing scene that camera 101 is capturing.

Note that server 103 may calculate the position of the capturing scene of each video in advance, or at any timing after reception of video signal 151.

Moreover, in addition to the position of the capturing scene, server 103 may increase the degree of relevance of the video having a size of the capturing scene close to a size of the capturing scene of the selected video.

Moreover, server 103 may not increase the degree of relevance of the video having the position of the capturing scene very close (almost identical) to the position of the capturing scene of the selected video.

Figure 7:
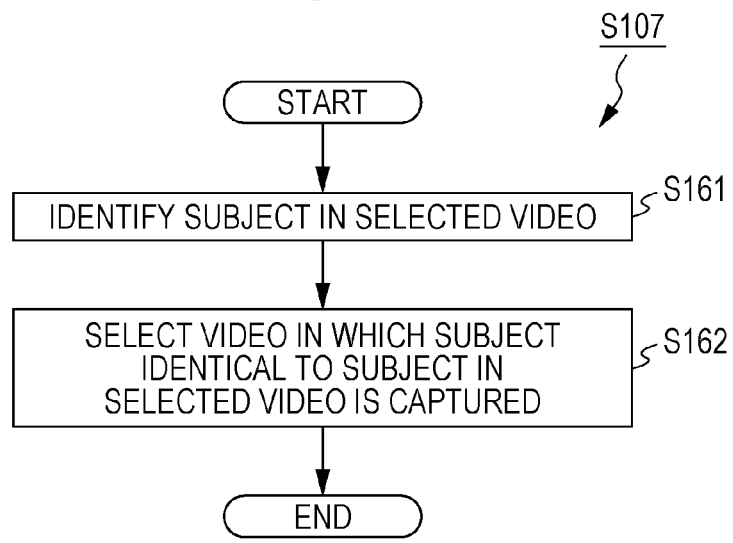
FIG. 7 is a diagram illustrating an example of the relevant video selection processing according to the first exemplary embodiment.

In an example illustrated in FIG. 7, server 103 identifies a subject (for example, a player) in the selected video (S161), and increases the degree of relevance of the video in which a subject identical to the subject in the selected video is captured (S162). For example, camera 101 identifies the subject in the video by an image analysis (such as face authentication), and transmits video signal 151 including information that indicates the subject to server 103. Server 103 uses the information to determine the subject in each video. Note that the image analysis may be performed by server 103. Moreover, the subject is not limited to a specific person but may be a specific team or the like.

Thus, server 103 calculates the degree of relevance by using information that camera 101 or server 103 generates by using at least one of the video captured by camera 101 and information acquired with a sensor attached to the camera.

Figure 8:
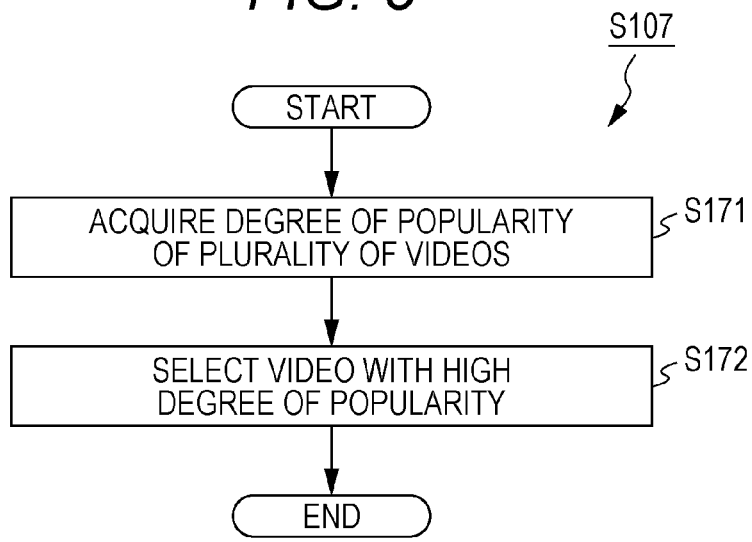
FIG. 8 is a diagram illustrating an example of the relevant video selection processing according to the first exemplary embodiment.

In an example illustrated in FIG. 8, server 103 acquires degrees of popularity of the plurality of videos (S171), and increases the degree of relevance of the video with a high degree of popularity (S172). Here, the degree of popularity indicates, for example, a number of times the video is viewed during a present or past certain time, or a number of users who view the video. Note that this degree of popularity is sequentially calculated, for example, by server 103 based on the viewing situation of the plurality of users.

Figure 9:
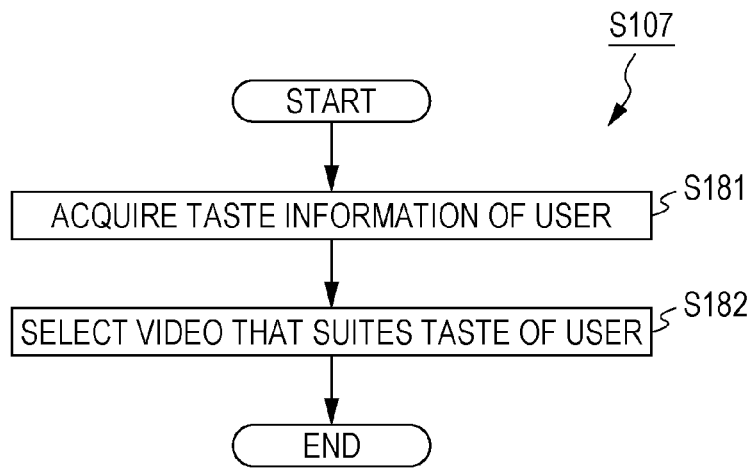
FIG. 9 is a diagram illustrating an example of the relevant video selection processing according to the first exemplary embodiment.

In an example illustrated in FIG. 9, server 103 acquires taste information of the user (S181), and increases the degree of relevance of the video that suites the taste of the user (S182). Here, the taste information is, for example, a viewing history of the user, or previously registered registration information that indicates the taste or hobby of the user. For example, when the user has viewed a lot of videos in which a specific player or team is captured, server 103 increases the degree of relevance of the video in which the player or team is captured. Moreover, when the registration information indicates a player or team the user supports, server 103 increases the degree of relevance of the video in which the player or team is captured.

In an example illustrated in FIG. 10, server 103 acquires communication bandwidth information that indicates a communication bandwidth available to terminal apparatus 102 (S191), and changes the degree of relevance in accordance with the communication bandwidth (S192). Specifically, server 103 increases the degree of relevance of the video with a bit rate, frame rate, or resolution suitable for the communication bandwidth available to terminal apparatus 102. For example, when the communication bandwidth available to terminal apparatus 102 is wide enough, server 103 increases the degree of relevance of the video with a high bit rate, frame rate, or resolution.

Note that server 103 may generate the video signals of a plurality of bit rates by converting the resolution or frame rate of video signals 151 transmitted from cameras 101, and may store the plurality of video signals.

Moreover, when the bandwidth available to terminal apparatus 102 fluctuates, the selected videos or relevant videos may be switched in accordance with the available bandwidth.

In an example illustrated in FIG. 11, server 103 acquires the communication bandwidth information that indicates the communication bandwidth available to terminal apparatus 102 (S191), and determines a number of relevant videos in accordance with the communication bandwidth (S193). Specifically, server 103 increases the number of relevant videos as the communication bandwidth is wider.

Thus, server 103 selects the video with a high degree of relevance to the selected video (first video) from among the plurality of videos as the relevant video (second video). Specifically, server 103 determines that the degree of relevance is higher as the position of the capturing scene is closer to the position of the capturing scene of the selected video. Moreover, server 103 determines that the degree of relevance is higher as the size of the capturing scene is closer to the size of the capturing scene of the selected video. Moreover, server 103 sets high degree of relevance of the video in which the subject identical to the subject in the selected video is captured.

Moreover, server 103 selects the relevant video based on the frame rates, resolution, or bit rates of the plurality of videos. Moreover, server 103 selects the video selected many times by other users from among the plurality of videos as the relevant video. Moreover, server 103 selects the relevant video, based on the viewing history or previously registered taste information of the user.

Figure 12:
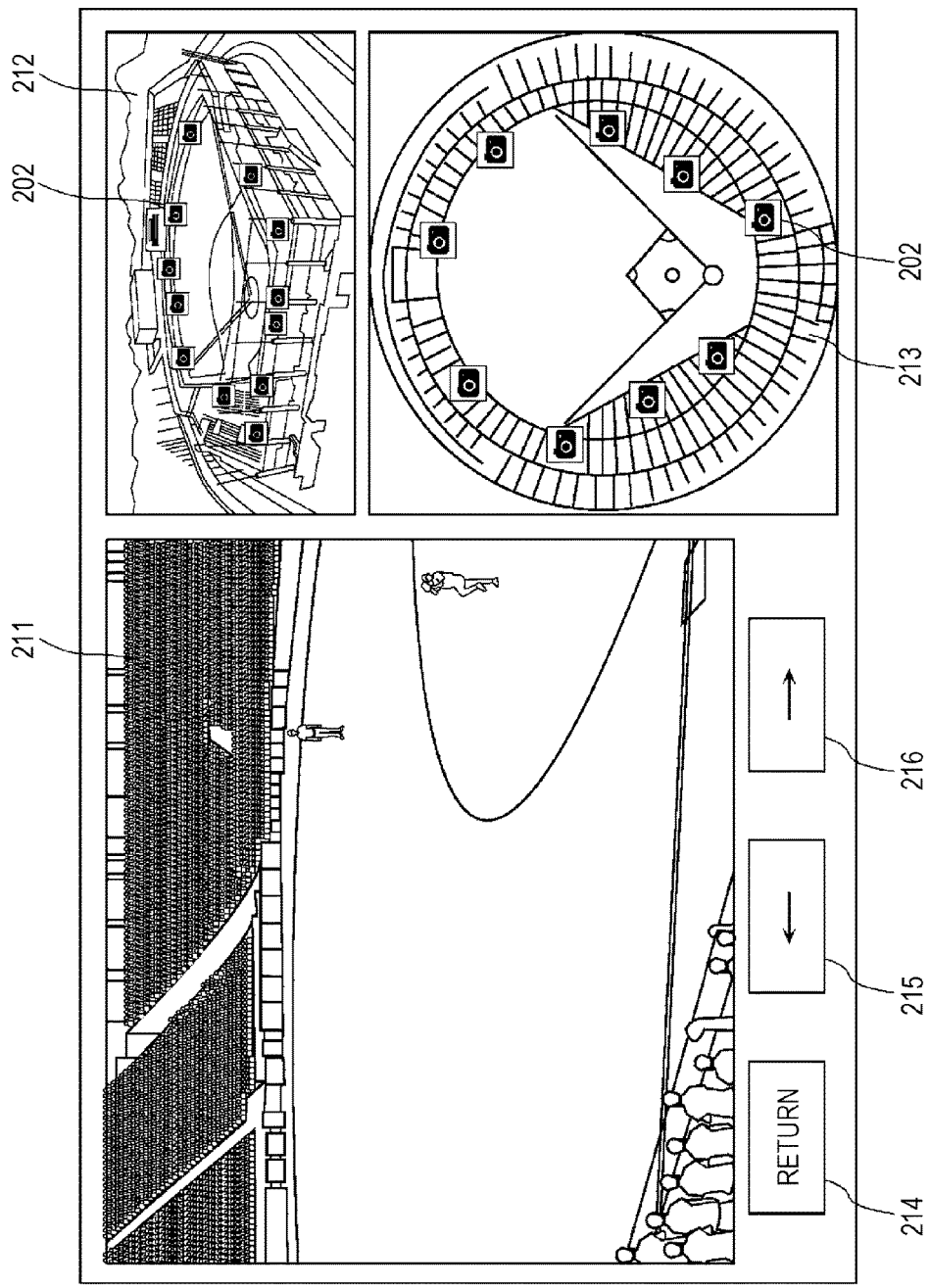
FIG. 12 is a diagram illustrating an example of a display screen according to the first exemplary embodiment.

FIG. 12 is a diagram illustrating an example of a display screen after the video is selected. As illustrated in FIG. 12, the display screen displays selected video 211 which is a selected video, bird's-eye image 212, top image 213, and operation buttons 214 to 216.

Bird's-eye image 212 is an image that overlooks the capturing scene, and includes camera icons 202. Bird's-eye image 212 is similar to the image displayed in the initial screen. Top image 213 is a diagram of the entire capturing scene viewed from above, and includes camera icons 202.

Operation buttons 214 to 216 are buttons for the user to perform operations. Selection of operation button 214 causes the display to return to the initial screen. The operation of operation button 215 or 216 causes the display video to be switched to another viewpoint video. Note that, at this time, the video with a high degree of relevance to the selected video is preferentially chosen.

For example, the operation of operation button 215 causes the display video to be switched to the video with the position of the capturing scene closest to the position of the capturing scene of the selected video.

Moreover, the operation of operation button 216 causes the display video to be switched to the video with a highest degree of recommendation. Accordingly, even when the video once selected and viewed does not suit user's taste, with simple operations the user can switch the display video to the video that enables the user to enjoy a game most at that time and can view the display video.

Moreover, selection of camera icon 202 in bird's-eye image 212 or top image 213 by the user causes the display video to be switched to the video corresponding to selected camera icon 202.

Note that arrangement of the respective images and operation buttons illustrated in FIG. 12 is an example, and the arrangement of the respective images and operation buttons is not limited to this example. Moreover, it is not necessary to display all the plurality of images and the plurality of operation buttons, but only part of the images and operation buttons may be displayed.

Here, in the present exemplary embodiment, a change in the display of camera icon 202 is made depending on the degree of relevance to the selected video. For example, camera icon 202 corresponding to the video with a high degree of relevance to the selected video is highlighted. Note that among the plurality of videos, only camera icon 202 corresponding to the video with a high degree of relevance to the selected video may be displayed. Moreover, depending on the degree of relevance, a change in the method for displaying camera icons 202 may be made continuously or step by step. Moreover, information that indicates the degree of relevance may be displayed near camera icons 202.

Moreover, as another exemplary embodiment, a sensor may be built in a ball, and how the ball has flown may be determined based on information sensed by the sensor. Then, a trajectory of the ball may be superimposed on bird's-eye mage 212 or top image 213.

Furthermore, when there is camera icon 202 at a destination at which the ball has flown, in terminal apparatus 102 server 103 may receive in advance the video signal of the viewpoint position close to the position of the ball.

That is, the system may acquire a flow of a game or the like by some means (for example, the sensor in the ball) and may estimate in advance camera icon 202 that the user wants to view, based on the information. Terminal apparatus 102 may receive the estimated videos in advance.

Moreover, server 103 may set priority of the plurality of videos based on, for example, the current situation such as the flow of a game, or the position of the user.

Description will be provided again with reference to FIG. 4. In the display screen illustrated in FIG. 5, an operation of viewpoint switching is performed (S109). Note that it is assumed here that the relevant video is selected. In this case, since terminal apparatus 102 has received relevant video signal 154 in advance, terminal apparatus 102 decodes relevant video signal 154 and displays the relevant video (S110). Thus, terminal apparatus 102 receives in advance the relevant video that is highly likely to be selected next time, and accordingly terminal apparatus 102 can switch the videos seamlessly.

Moreover, terminal apparatus 102 transmits to server 103 viewpoint specification signal 152 that indicates the selected viewpoint (S111). Moreover, server 103 having received viewpoint specification signal 152 transmits selected video signal 153 specified by viewpoint specification signal 152 to terminal apparatus 102. That is, server 103 continues transmission of previous relevant video signal 154 as transmission of selected video signal 153 (S112). Moreover, server 103 selects relevant video signal 154 relevant to newly selected video signal 153 (S113), and starts transmission of relevant video signal 154 to terminal apparatus 102 (S114).

Note that order of video display (S110) and transmission of viewpoint specification signal 152 (S111) may be any order, and part of video display (S110) and transmission of viewpoint specification signal 152 (S111) may be performed in parallel.

Figure 13:
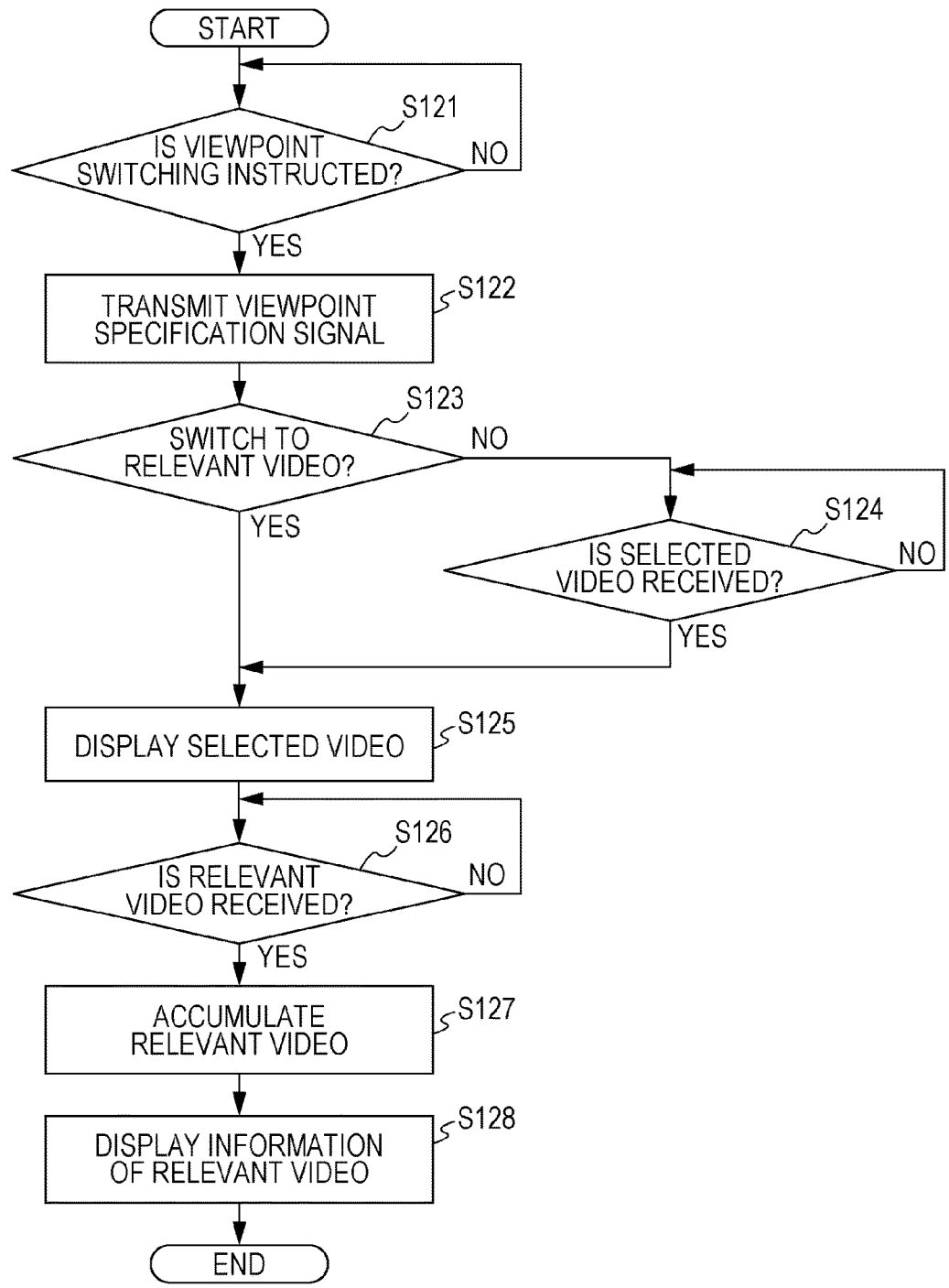
FIG. 13 is a flowchart of processing performed by the terminal apparatus according to the first exemplary embodiment.

Next, a flow of operations of terminal apparatus 102 will be described. FIG. 13 is a flowchart illustrating the flow of operations of terminal apparatus 102. Note that FIG. 13 illustrates processing performed by terminal apparatus 102 in a state where a certain viewpoint video is displayed.

Terminal apparatus 102 determines whether viewpoint switching is instructed by the user operation (S121). When the viewpoint switching is instructed (Yes in S121), terminal apparatus 102 transmits viewpoint specification signal 152 to server 103 (S122).

Moreover, terminal apparatus 102 determines whether the selected video of a viewpoint switching destination is the relevant video (S123). When the selected video is not the relevant video (No in S123), terminal apparatus 102 waits for reception of the selected video transmitted by server 103 depending on viewpoint specification signal 152 (S124), and when terminal apparatus 102 has received the selected video (Yes in S124), terminal apparatus 102 displays the selected video (S125).

Meanwhile, when the selected video is the relevant video (Yes in S123), terminal apparatus 102 displays the already accumulated relevant video as the selected video (S125).

Here, when the present system displays a live video, the decoded videos may be switched at time when decoding of a random access frame is completed. At this time, although waiting time occurs from time when user's viewpoint switching instruction is issued to switching time, during this waiting time terminal apparatus 102 may continue reproducing the video prior to the switching, or may display a waiting screen.

Moreover, when the present system displays a highlight video instead of a live video, terminal apparatus 102 may search for a random access point at time nearest to playback time of the video prior to the switching, and may decode and display the video from the random access point.

Next, when terminal apparatus 102 has received the relevant video relevant to the newly selected video (Yes in S126), terminal apparatus 102 accumulates the received relevant video in accumulator 122 sequentially (S127). Note that data of the displayed selected video and data of the relevant video that is not used for a certain period after reception are sequentially deleted from accumulator 122.

Next, terminal apparatus 102 displays information of the newly received relevant video (S128). Specifically, terminal apparatus 102 highlights camera icon 202 of the relevant video. For example, camera icon 202 of the relevant video is displayed larger than other camera icons 202. Moreover, a border line of camera icon 202 of the relevant video is displayed thicker than the border lines of other camera icons 202. Alternatively, a change of a color of camera icon 202 of the relevant video to a conspicuous color such as red is made. Note that methods for displaying with highlighting are not limited thereto.

Figure 14:
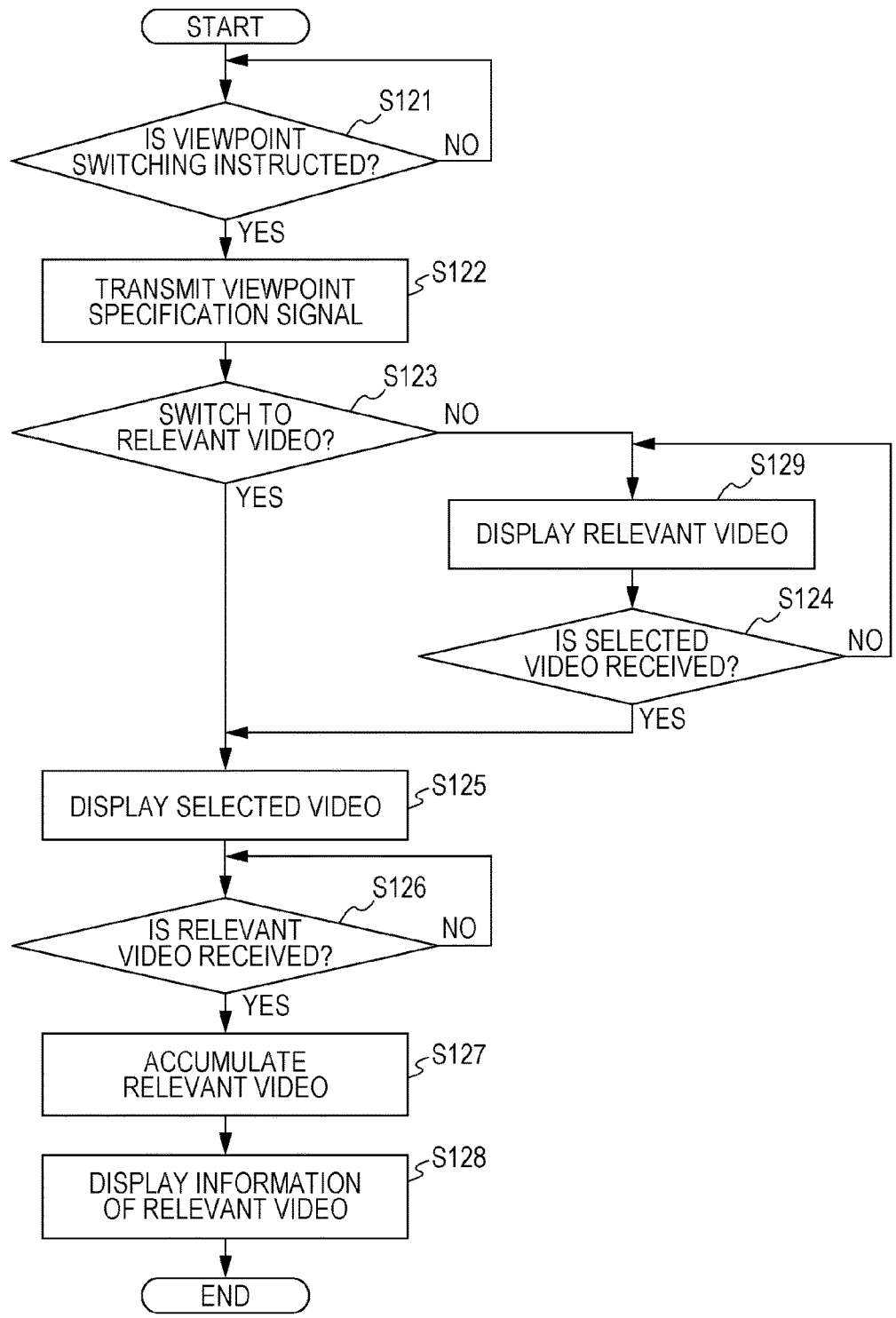
FIG. 14 is a flowchart of a variation of processing performed by the terminal apparatus according to the first exemplary embodiment.
Figure 15:
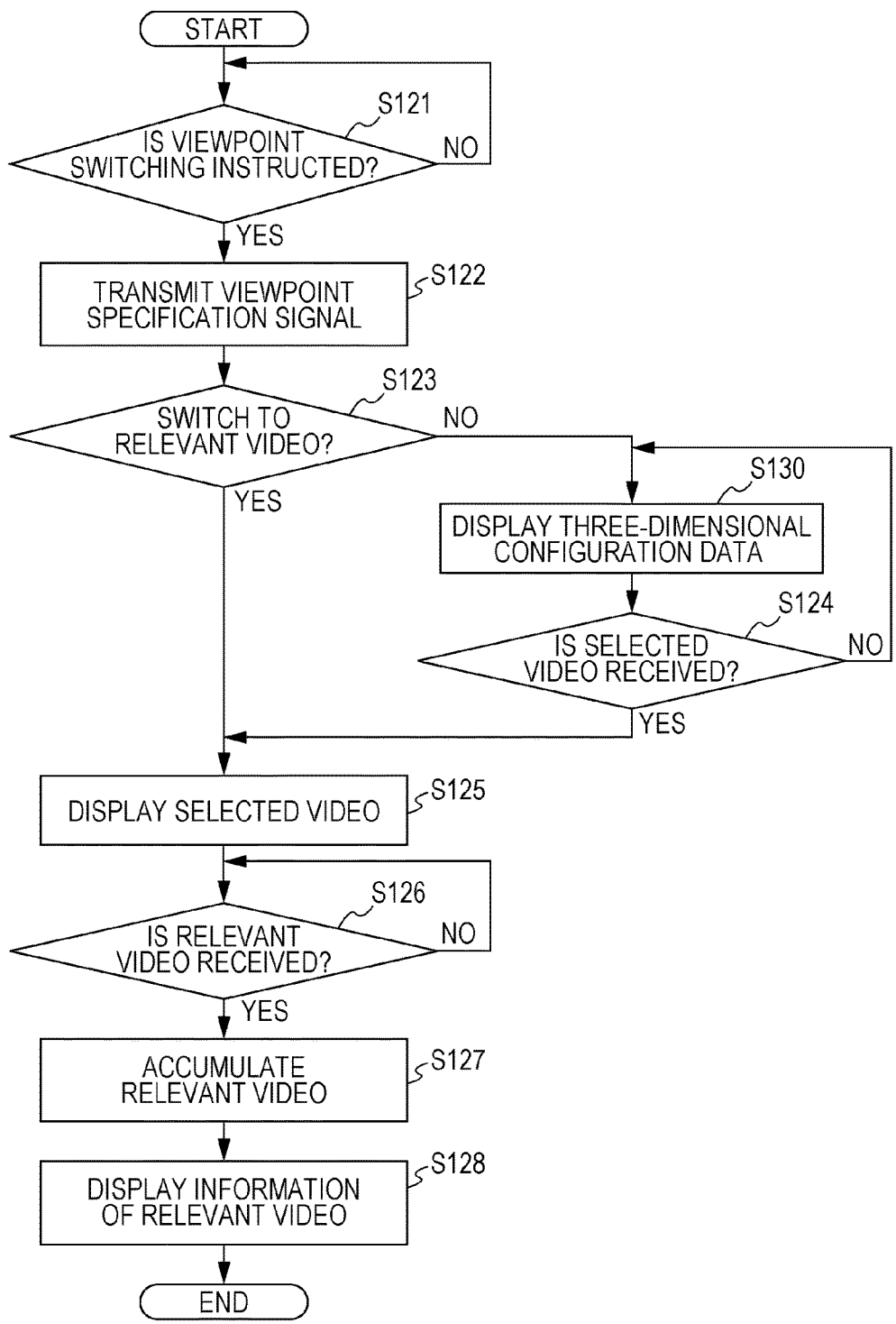
FIG. 15 is a flowchart of a variation of processing performed by the terminal apparatus according to the first exemplary embodiment.

Note that terminal apparatus 102 may perform processing illustrated in FIG. 14 or FIG. 15. FIG. 14 and FIG. 15 are flowcharts each illustrating a flow of a variation of operations of terminal apparatus 102.

In the processing illustrated in FIG. 14, step S129 is added to the processing illustrated in FIG. 13. That is, when the selected video is not the relevant video (No in S123), terminal apparatus 102 displays the relevant video during a period until reception of the selected video (S129). Moreover, when terminal apparatus 102 has accumulated a plurality of relevant videos, terminal apparatus 102 may display the relevant video with the highest degree of relevance to the newly selected video, among the accumulated plurality of relevant videos.

Moreover, in the processing illustrated in FIG. 15, step S130 is added to the processing illustrated in FIG. 13. That is, when the selected video is not the relevant video (No in S123), terminal apparatus 102 displays three-dimensional configuration data during the period until reception of the selected video (S130). Here, the three-dimensional configuration data is three-dimensional configuration data of a place where the plurality of videos is captured. In the example illustrated in FIG. 5, the three-dimensional configuration data is three-dimensional configuration data of a baseball ground. Moreover, this three-dimensional configuration data is generated in server 103 by using the plurality of video signals 151, and is transmitted to terminal apparatus 102 in advance.

Note that terminal apparatus 102 may use the three-dimensional configuration data to generate the video to be displayed during this period. For example, terminal apparatus 102 may generate the video in which a change of the viewpoint position is continuously made from the viewpoint position of the immediately preceding display video to the viewpoint position of the selected video in the three-dimensional configuration data, and may display the generated video during the above-described period. Moreover, such a visual effect may also be used in the case where video data is accumulated in accumulator 122. Further, whether or not to use this visual effect may be switched depending on a distance between the viewpoint position of the immediately preceding display video and the viewpoint position of the selected video. For example, when the distance is short, the visual effect is not used, but the visual effect is used when the distance is long.

Moreover, the example of displaying the relevant video or three-dimensional configuration data during the waiting time until reception of the selected video is described above; however, when terminal apparatus 102 cannot receive the selected video due to some error, for example, when terminal apparatus 102 cannot receive the selected video due to communication errors or the like, terminal apparatus 102 may display the relevant video or three-dimensional configuration data.

Moreover, when terminal apparatus 102 cannot receive the selected video and camera 101 capturing the video exists near the user, terminal apparatus 102 may receive the video signal directly from camera 101 by using another communication method such as near field communication.

As described above, terminal apparatus 102 receives any one of the plurality of videos captured from the plurality of viewpoints from server 103, and displays the received video. First, terminal apparatus 102 selects the selected video (first video) from the plurality of videos (S121). Next, terminal apparatus 102 requests server 103 to transmit the selected video (S122). Next, terminal apparatus 102 receives the selected video from server 103 (S124), and displays the selected video (S125). Next, terminal apparatus 102 starts reception of the relevant video that is one of the plurality of videos and different from the selected video and that is highly likely to be selected next time, during reception and display of the selected video (S126).

Moreover, terminal apparatus 102 accumulates the received relevant video (S127). When the relevant video is selected during display of the selected video (Yes in S123), terminal apparatus 102 displays the accumulated relevant video (S125).

Moreover, when a third video different from the selected video and relevant video is selected during display of the selected video (No in S123), terminal apparatus 102 receives the third video from server 103 (S124). Terminal apparatus 102 displays the accumulated relevant video until terminal apparatus 102 receives the third video (S129).

Figure 16:
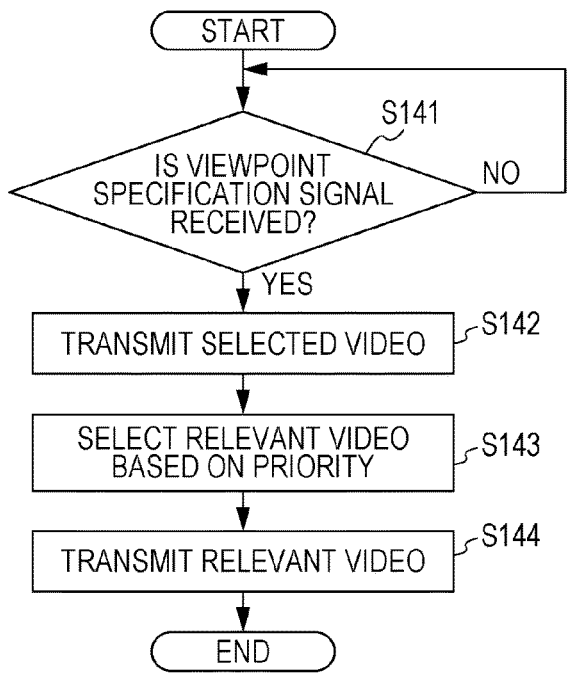
FIG. 16 is a flowchart of processing performed by the server according to the first exemplary embodiment.

Next, a flow of operations of server 103 will be described. FIG. 16 is a flowchart illustrating the flow of the operations of server 103.

First, server 103 determines whether server 103 has received viewpoint specification signal 152 from terminal apparatus 102 (S141). When server 103 has received viewpoint specification signal 152 (Yes in S141), server 103 selects the video signal indicated by viewpoint specification signal 152 from the plurality of accumulated video signals as selected video signal 153, and transmits selected video signal 153 to terminal apparatus 102 (S142).

Moreover, as described above, server 103 selects relevant video signal 154 with a high degree of relevance to the selected video from the plurality of accumulated video signals 151 based on priority (S143), and transmits relevant video signal 154 to terminal apparatus 102 (S144).

As described above, server 103 distributes to terminal apparatus 102 any one of the plurality of videos captured by the plurality of users from different viewpoints. First, server 103 distributes to terminal apparatus 102 the selected video (first video) that is one of the plurality of videos and that is requested by terminal apparatus 102 (S142). Next, server 103 selects the relevant video (second video) that is different from the selected video and that is highly likely to be requested next time by terminal apparatus 102, from among the plurality of videos (S143). In other words, the relevant video is a video that is not requested by terminal apparatus 102. Next, server 103 starts transmission of the relevant video to terminal apparatus 102 while distributing the selected video to terminal apparatus 102 (S144).

The video distribution method, the video reception method, and the video distribution system according to the exemplary embodiment are described above; however, the present disclosure is not limited to this exemplary embodiment.

Moreover, respective processors in respective apparatuses in the video distribution system according to the above-described exemplary embodiment are typically implemented as a large scale integrated circuit (LSI) which is an integrated circuit. These processors may be integrated individually into one chip, and may be integrated into one chip so as to include part or all of the processors.

Moreover, circuit integration is not limited to LSI but may be implemented using dedicated circuitry or a general-purpose processor. A field programmable gate array (FPGA) which is programmable after manufacture of an LSI, or a reconfigurable processor in which connections or settings of circuit cells within the LSI are reconfigurable may be used.

In the above-described exemplary embodiment, each component may be formed with dedicated hardware, or may be implemented by execution of a software program suitable for each component. Each component may be implemented by a program executer such as a CPU or a processor that reads and executes the software program recorded in a recording medium such as a hard disk or a semiconductor memory.

In other words, each apparatus in the video distribution system includes processing circuitry and a storage (accessible from the processing circuitry) electrically connected to the processing circuitry. The processing circuitry includes at least one of the dedicated hardware and the program executer. Moreover, when the processing circuitry includes the program executer, the storage stores the software program to be executed by the program executer. The processing circuitry uses the storage to execute the video distribution method or the video reception method according to the above-described exemplary embodiment.

Further, the present disclosure may be the above-described software program, and may be a non-transitory computer-readable recording medium storing the above-described program thereon. Moreover, it is needless to say that the program can be distributed via a transmission medium such as the Internet.

Moreover, all numerals used above are examples used for describing the present disclosure specifically, and the present disclosure is not limited thereto.

Moreover, the order of executing the steps in the above-described video distribution method or the video reception method is an example used for describing the present disclosure specifically, and may be order other than the above-described order. Moreover, some of the above-described steps may be executed simultaneously (in parallel) with another step The video distribution method, the video reception method, the video distribution system, the server, and the terminal apparatus according to one or more aspects of the present disclosure are described above based on the exemplary embodiment; however, the present disclosure is not limited to this exemplary embodiment. Various variations conceivable by a person skilled in the art may be applied to the present exemplary embodiment, and components of different exemplary embodiments may also be combined within the scope of the one or more aspects of the present disclosure as long as such variations and combination do not depart from the gist of the present disclosure.

Second Exemplary Embodiment

Other application examples of the configurations of the image processing method and apparatus described in each exemplary embodiment described above and a system using the application examples will be described. The system is applicable to an increasingly intelligent video system with object space extending to a wider area. For example, the system is applicable to (1) a monitoring system mounted in a security camera of a store or a factory, a vehicle-mounted camera of the police or the like, (2) a transportation information system using a camera owned by an individual person, each vehicle-mounted camera, a camera installed in a road or the like, (3) an environmental research or delivery system using a remote-controllable or auto-controllable apparatus such as a drone, and (4) a content transmission and reception system of a video or the like using a camera installed in an entertainment facility, a stadium or the like, a moving camera such as a drone, a camera owned by an individual person or the like.

Figure 17:
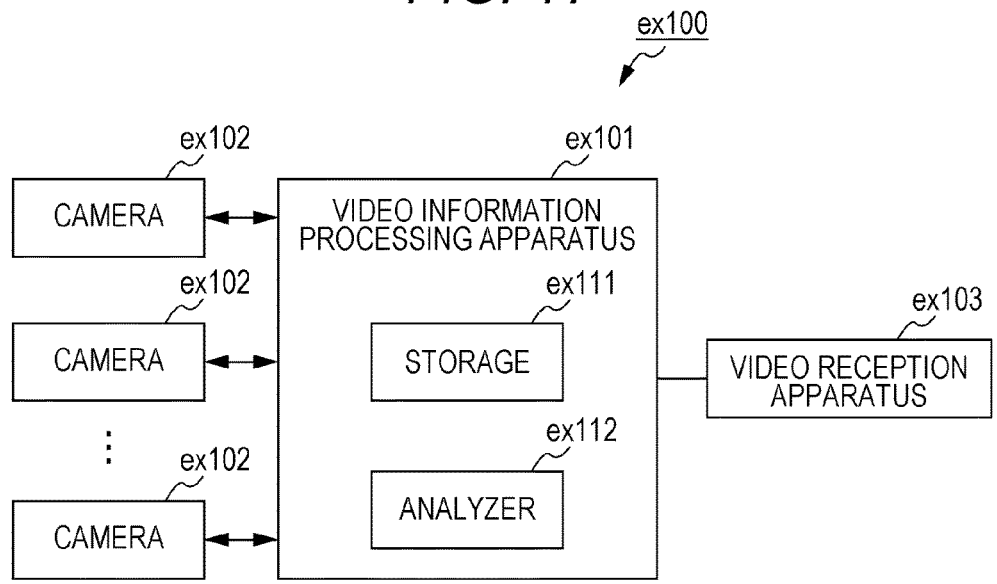
FIG. 17 is a diagram illustrating a configuration of a video information processing system.

FIG. 17 is a diagram illustrating a configuration of video information processing system ex100 according to the present exemplary embodiment. The present exemplary embodiment describes an example of preventing occurrence of a dead angle and an example of prohibiting capturing of a specific area.

Video information processing system ex100 illustrated in FIG. 17 includes video information processing apparatus ex101, a plurality of cameras ex102, and video reception apparatus ex103. Note that video information processing system ex100 does not necessarily need to include video reception apparatus ex103.

Video information processing apparatus ex101 includes storage ex111 and analyzer ex112. Each of N cameras ex102 has a function of capturing videos and a function of transmitting captured video data to video information processing apparatus ex101. Moreover, camera ex102 may have a function of displaying a video that is being captured. Note that camera ex102 may code a captured video signal by using a coding scheme such as HEVC or H.264, and may then transmit the coded video signal to video information processing apparatus ex101, or camera ex102 may transmit the video data that is not coded to video information processing apparatus ex101.

Here, each camera ex102 is a fixed camera such as a monitoring camera, a moving camera mounted in a radio-controlled unmanned flight vehicle, a vehicle or the like, or a user camera owned by a user.

The moving camera receives an instruction signal transmitted from video information processing apparatus ex101, and changes a position or capturing direction of the moving camera itself in response to the received instruction signal.

Moreover, time of the plurality of cameras ex102 is calibrated by using time information of a server or a reference camera prior to start of capturing. Moreover, spatial positions of the plurality of cameras ex102 are calibrated based on how an object in space to be captured is captured or a relative position from a reference camera.

Storage ex111 in information processing apparatus ex101 stores the video data transmitted from N cameras ex102.

Analyzer ex112 detects a dead angle from the video data stored in storage ex111, and transmits to the moving camera the instruction signal that indicates an instruction to the moving camera for preventing occurrence of a dead angle. The moving camera moves in response to the instruction signal, and continues capturing.

Analyzer ex112 detects a dead angle by using Structure from Motion (SfM), for example. SfM is a technique of restoring a three-dimensional shape of a subject from a plurality of videos captured from different positions, and SfM is widely known as a shape restoration technology of estimating a subject shape and a camera position simultaneously. For example, analyzer ex112 restores the three-dimensional shape in the facility or in the stadium from the video data stored in storage ex111 by using SfM, and detects as a dead angle an area that cannot be restored.

Note that when the position and capturing direction of camera ex102 are fixed and information of the position and capturing direction is known, analyzer ex112 may perform SfM by using these pieces of known information. Moreover, when the position and capturing direction of the moving camera can be acquired with, for example, a GPS and angle sensor in the moving camera, the moving camera may transmit information of the position and capturing direction of the moving camera to analyzer ex112, and analyzer ex112 may perform SfM by using the transmitted information of the position and the capturing direction.

Note that a method for detecting a dead angle is not limited to the above-described method using SfM. For example, analyzer ex112 may use information from a depth sensor such as a laser range finder, to know a spatial distance of the object to be captured. Moreover, when an image includes a marker that is set in space in advance or a specific object, analyzer ex112 may detect information of the camera position, capturing direction, and zoom magnification from the size of the marker or the object. Thus, analyzer ex112 detects a dead angle by using any method that enables detection of the capturing area of each camera. Moreover, analyzer ex112 may acquire, for example, information of a mutual positional relationship between a plurality of objects to be captured, from video data or a proximity sensor, and analyzer ex112 may identify an area where a dead angle is highly likely to occur, based on the acquired positional relationship.

Here, the dead angle includes not only a portion having no video in an area to be captured but also a portion having poor image quality as compared to other portions, and a portion having no predetermined image quality. This portion to be detected may be set appropriately according to the configuration or purpose of the system. For example, required image quality of a specific subject in space to be captured may be set high. Moreover, conversely, the required image quality of a specific area in space to be captured may be set low, and the required image quality may be set such that the area is not determined to be a dead angle even when no video is captured.

Note that the above-described image quality includes various pieces of information regarding a video, such as area occupied by a subject to be captured in the video (for example, a number of pixels), or whether the video is focused on the subject to be captured. Based on these pieces of information or combination thereof, whether the area is a dead angle may be determined.

Note that detection of the area that is actually a dead angle is described above, but the area that needs to be detected in order to prevent occurrence of a dead angle is not limited to the area that is actually a dead angle. For example, when a plurality of objects to be captured exists and at least part of the objects is moving, a new dead angle is likely to occur because another object to be captured enters between a certain object to be captured and a camera. Meanwhile, analyzer ex112 may detect movement of the plurality of objects to be captured from, for example, the captured video data, and analyzer ex112 may estimate the area that is likely to become a new dead angle, based on the detected movement of the plurality of objects to be captured and positional information of camera ex102. In this case, video information processing apparatus ex101 may transmit the instruction signal to the moving camera to capture the area that is likely to become a dead angle, and video information processing apparatus ex101 may prevent occurrence of a dead angle.

Note that when there is a plurality of moving cameras, video information processing apparatus ex101 needs to select any of the moving cameras to which the instruction signal is to be transmitted in order to cause the moving camera to capture a dead angle or an area that is likely to become a dead angle. Moreover, when there is a plurality of moving cameras and there is a plurality of dead angles or areas that are likely to become dead angles, video information processing apparatus ex101 needs to determine which dead angle or area that is likely to become a dead angle each of the plurality of moving cameras is to capture. For example, video information processing apparatus ex101 selects the moving camera closest to a dead angle or an area that is likely to become a dead angle, based on a position of a dead angle or an area that is likely to become a dead angle, and a position of an area each moving camera is capturing. Moreover, video information processing apparatus ex101 may determine for each camera whether a new dead angle occurs when video data which the moving camera is currently capturing is not obtained, and video information processing apparatus ex101 may select the moving camera that is determined that a dead angle does not occur even when the video data which is currently being captured is not obtained.

The above-described configuration enables video information processing apparatus ex101 to prevent occurrence of a dead angle by detecting a dead angle and transmitting the instruction signal to the moving camera so as to prevent the dead angle.

Variation 1

Note that the example of transmitting the instruction signal for instructing the moving camera to move is described above; however, the instruction signal may be a signal for instructing the user of the user camera to move. For example, the user camera displays an instruction image that instructs the user to change the direction of the camera, based on the instruction signal. Note that the user camera may display the instruction image that indicates a movement path on a map, as the user movement instruction. Moreover, in order to improve the quality of the acquired image, the user camera may display detailed capturing instructions such as the capturing direction, an angle, an angle of view, image quality, and movement of the capturing area. Further, video information processing apparatus ex101 may automatically control such feature data of camera ex102 regarding capturing when the feature data is controllable on a video information processing apparatus ex101 side.

Here, the user camera is, for example, a smartphone, a tablet terminal, a wearable terminal, or a head mounted display (HMD) that a spectator in the stadium or a guard in the facility carries.

Moreover, a display terminal that displays the instruction image does not need to be identical to the user camera that captures video data. For example, the user camera may transmit the instruction signal or the instruction image to the display terminal associated with the user camera in advance, and the display terminal may display the instruction image. Moreover, information of the display terminal corresponding to the user camera may be registered in video information processing apparatus ex101 in advance. In this case, video information processing apparatus ex101 may cause the display terminal to display the instruction image by transmitting the instruction signal directly to the display terminal corresponding to the user camera.

Variation 2

Analyzer ex112 may generate a free viewpoint video (three-dimensional reconfiguration data), for example, by using SfM to restore the three-dimensional shape in the facility or in the stadium from the video data stored in storage ex111. This free viewpoint video is stored in storage ex111. Video information processing apparatus ex101 reads from storage ex111 the video data according to visual field information (and/or viewpoint information) transmitted from video reception apparatus ex103, and transmits the read video data to video reception apparatus ex103. Note that video reception apparatus ex103 may be one of the plurality of cameras ex102.

Variation 3

Video information processing apparatus ex101 may detect a capturing prohibited area. In this case, analyzer ex112 analyzes the captured image, and when the moving camera is capturing the capturing prohibited area, analyzer ex112 transmits a capturing prohibition signal to the moving camera. The moving camera stops capturing while receiving the capturing prohibition signal.

For example, analyzer ex112 matches three-dimensional virtual space restored by using SfM with the captured video, and accordingly analyzer ex112 determines whether the moving camera set in advance in space is capturing the capturing prohibited area. Alternatively, analyzer ex112 determines whether the moving camera is capturing the capturing prohibited area, by using a marker or characteristic object placed in space as a trigger. The capturing prohibited area is, for example, a rest room in the facility or in the stadium.

Moreover, when the user camera is capturing the capturing prohibited area, the user camera may notify the user of a fact that the current place is a capturing prohibited place, by causing a display connected wirelessly or with wires to display a message, or by outputting a sound or voice from a speaker or an earphone.

For example, a fact that capturing in the current direction of the camera orientation is prohibited is displayed as the message. Alternatively, the capturing prohibited area and the current capturing area are indicated on a displayed map. Moreover, the capturing is automatically resumed, for example, when the capturing prohibition signal is no longer output. Moreover, the capturing may be resumed when the capturing prohibition signal is not output and the user performs operations for resuming the capturing. Moreover, when the capturing is stopped and resumed twice or more in a short period, calibration may be performed again. Moreover, notification for checking the current position or for prompting movement may be given to the user.

Moreover, in a case of special work such as the police, pass code or fingerprint authentication or the like that disables such a function may be used for recording. Further, even in such a case, when the video of the capturing prohibited area is displayed or stored outside, image processing such as mosaic may be performed automatically.

The above configuration enables video information processing apparatus ex101 to set a certain area as the capturing prohibited area by performing determination of capturing prohibition and giving the user notification for stopping capturing.

Variation 4

Since it is necessary to collect videos of the plurality of viewpoints in order to construct three-dimensional virtual space from the videos, video information processing system ex100 sets an incentive for a user who transmits a captured video. For example, video information processing apparatus ex101 distributes videos with no charge or at discount rate to the user that transmits a video, or gives the user who transmits a video a point having a monetary value that can be used in an online or off-line store or in a game, or a point having a non-monetary value such as a social status in virtual space such as a game. Moreover, video information processing apparatus ex101 gives a particularly high point to the user who transmits the captured video of a valuable visual field (and/or viewpoint) such as a frequently requested video.

Variation 5

Video information processing apparatus ex101 may transmit additional information to the user camera based on an analysis result made by analyzer ex112. In this case, the user camera superimposes the additional information of the captured video, and displays the superimposed video on a screen. The additional information is, for example, information of a player such as a player name or height when a game in a stadium is captured, and the player name or a photograph of the player's face is displayed in association with each player in the video. Note that video information processing apparatus ex101 may extract the additional information by search via the Internet based on part or all areas of the video data. Moreover, camera ex102 may receive such additional information by the near field communication including Bluetooth (registered trademark) or by visible light communication from illumination of the stadium or the like, and may map the received additional information to the video data. Moreover, camera ex102 may perform this mapping based on a certain rule such as a table that is kept in the storage connected to camera ex102 wirelessly or with wires and that indicates correspondence between the information obtained by the visible light communication technology and the additional information. Camera ex102 may perform this mapping by using a result of a most probable combination by Internet search.

Moreover, in the monitoring system, a highly accurate monitoring system can be implemented, for example, by superimposition of information of a person on a blacklist on the user camera carried by a guard in the facility.

Variation 5 Analyzer ex112 may determine which area in the facility or in the stadium the user camera is capturing, by matching the free viewpoint video with the video captured by the user camera. Note that the method for determining the capturing area is not limited thereto, but various methods for determining the capturing area described in each of the above-described exemplary embodiments or other methods for determining the capturing area may be used.

Video information processing apparatus ex101 transmits a past video to the user camera based on the analysis result made by analyzer ex112. The user camera superimposes the past video on the captured video, or replaces the captured video with the past video, and displays the video on a screen.

For example, a highlight scene of a first half is displayed as a past video during halftime. This enables the user to enjoy the highlight scene of the first half during halftime as a video captured in a direction in which the user is watching. Note that the past video is not limited to the highlight scene of the first half, but may be the highlight scene of the past game held in the stadium. Moreover, timing at which video information processing apparatus ex101 distributes the past video is not limited to timing of distributing during halftime, but may be, for example, timing of distributing after the game end or during the game. In particular, in the case of distributing during halftime, video information processing apparatus ex101 may distribute a scene which the user has missed and which is considered to be important, based on the analysis result made by analyzer ex112. Moreover, video information processing apparatus ex101 may distribute the past video only when there is a user request, or may distribute a message of distribution permission prior to distribution of the past video.

Variation 6

Video information processing apparatus ex101 may transmit advertisement information to the user camera based on the analysis result made by analyzer ex112. The user camera superimposes the advertisement information of the captured video, and displays the superimposed video on a screen.

The advertisement information may be distributed, for example, immediately before distribution of the past video during halftime or after the game end as described in variation 5. This enables a distribution company to obtain advertising rates from an advertiser and to provide the user with video distribution services at a low cost or with no charge. Moreover, video information processing apparatus ex101 may distribute a message of advertisement distribution permission immediately before distribution of the advertisement information, or may provide services with no charge only when the user views the advertisement, or may provide services at a lower cost than a cost in the case where the user does not view the advertisement.

Moreover, when the user clicks "Order now" or the like in response to the advertisement, t a staff member who knows the position of the user based on the system or some positional information, or an automatic delivery system in the facility delivers an ordered drink to a seat of the user. Payment may be made by hand delivery to the staff member, or may be made based on credit card information set in an app of a mobile terminal or the like in advance. Moreover, the advertisement may include a link to an e-commerce site, and on-line shopping such as ordinary home delivery may be possible.

Variation 7

Video reception apparatus ex103 may be one of the cameras ex102 (user cameras).

In this case, analyzer ex112 matches the free viewpoint video with the video captured by the user camera, and accordingly analyzer ex112 determines which area in the facility or in the stadium the user camera is capturing. Note that the method for determining the capturing area is not limited thereto.

For example, when the user performs a swipe operation in a direction of an arrow displayed on a screen, the user camera generates viewpoint information that indicates movement of the viewpoint in the direction. Video information processing apparatus ex101 reads from storage ex111 the video data that captures an area that is moved according to the viewpoint information from the area captured by the user camera determined by analyzer ex112, and video information processing apparatus ex101 starts transmission of the read video data to the user camera. Then, the user camera displays the video distributed from video information processing apparatus ex101, instead of the captured video.

This enables the user in the facility or in the stadium to view the video captured from a favorite viewpoint with such a simple operation as screen swipe. For example, a spectator who is watching a game on a third base side of a baseball stadium can view the video captured from the viewpoint on a first base side. Moreover, the monitoring system enables a guard in the facility to view, for example, the video of the viewpoint from which the guard wants to check or the video to be watched closely as an interruption from a center, while changing the viewpoint adaptively, with such a simple operation as screen swipe. For this reason, a highly accurate monitoring system can be implemented.

Moreover, distribution of the video to the user in the facility or in the stadium is effective, for example, even when an obstacle exists between the user camera and an object to be captured, and there is an invisible area. In this case, he user camera may switch the video of some area of the areas captured by the user camera that includes the obstacle, from the captured video to a video distributed from video information processing apparatus ex101, and may display the distributed video, or the user camera may switch the entire screen from the captured video to the distributed video, and may display the distributed video. Moreover, the user camera may combine the captured video with the distributed video to display the video that seems to penetrate the obstacle such that the object to be viewed is visible. Even when the object to be captured is invisible from the position of the user due to influence of the obstacle, this configuration can reduce the influence of the obstacle because the user can view the video distributed from video information processing apparatus ex101.

Moreover, when the distributed video is displayed as the video of the area invisible due to the obstacle, display switching control different from display switching control depending on input processing made by the user such as the screen swipe described above may be performed. For example, when it is determined that the capturing area includes the obstacle, based on information of movement and capturing direction of the user camera, and based on positional information of the obstacle obtained in advance, display switching from the captured video to the distributed video may be performed automatically. Moreover, when it is determined from analysis of the captured video data that the obstacle which is not the object to be captured is being captured, display switching from the captured video to the distributed video may be performed automatically. Moreover, when area of the obstacle in the captured video (for example, a number of pixels) exceeds a predetermined threshold, or when a ratio of the area of the obstacle to area of the object to be captured exceeds a predetermined proportion, display switching from the captured video to the distributed video may be performed automatically.

Note that the display switching from the captured video to the distributed video, and display switching from the distributed video to the captured video may performed in response to the input processing made by the user.

Variation 8

A speed at which the video data is transmitted to video information processing apparatus ex101 may be instructed based on importance of the video data captured by each camera ex102.

In this case, analyzer ex112 determines importance of video data stored in storage ex111 or importance of camera ex102 that captures the video data. The determination of the importance here is made based on, for example, a number of persons or a number of moving objects in the video, the information such as image quality of the video data, or combination thereof.

Moreover, the determination of the importance of the video data may be made based on the position of camera ex102 that captures the video data or the area captured in the video data. For example, when a plurality of other capturing cameras ex102 exists near camera ex102 concerned, the importance of the video data captured by camera ex102 concerned is set low. Moreover, when the position of camera ex102 concerned is distant from the positions of other cameras ex102, but there exists a plurality of other cameras ex102 that captures an identical area, the importance of the video data captured by camera ex102 concerned is set low. Moreover, the determination of the importance of the video data may be made based on frequency of requests in video distribution services. Note that the method for determining the importance is limited to neither the above-described methods nor combination thereof, but may be a method according to the configuration or purpose of the monitoring system or video distribution system.

Moreover, the determination of the importance may not be made based on the captured video data. For example, the importance of camera ex102 that transmits the video data to terminals other than video information processing apparatus ex101 may be set high. Conversely, the importance of camera ex102 that transmits the video data to terminals other than video information processing apparatus ex101 may be set low. Accordingly, for example, when a plurality of services that needs transmission of video data uses a common communication band, a degree of freedom of controlling the communication band according to a purpose or characteristics of each service increases. This prevents quality of each service to degrade because necessary video data cannot be obtained.

Moreover, analyzer ex112 may determine the importance of the video data by using the free viewpoint video and the captured video of camera ex102.

Video information processing apparatus ex101 transmits a communication speed instruction signal to camera ex102 based on a determination result of the importance made by analyzer ex112. Video information processing apparatus ex101 gives instruction of high speed communication to, for example, camera ex102 that is capturing a video with high importance. Moreover, n addition to speed control, regarding important information, video information processing apparatus ex101 may transmit a signal that instructs a scheme for sending the important information twice or more in order to reduce disadvantages owing to loss. This enables efficient communication in the entire facility or in the entire stadium. Note that communication between camera ex102 and video information processing apparatus ex101 may be wired communication, or may be wireless communication. Moreover, video information processing apparatus ex101 may control only any one of the wired communication and wireless communication.

Camera ex102 transmits the captured video data to video information processing apparatus ex101 at the communication speed according to the communication speed instruction signal. Note that when retransmission fails predetermined number of times, camera ex102 may stop retransmission of the captured video data and start transmission of next captured video data. This enables efficient communication in the entire facility or in the entire stadium and high-speed processing in analyzer ex112 can be implemented.

Moreover, when the communication speed allocated to each camera ex102 fails to have a bandwidth sufficient for transmitting the captured video data, camera ex102 may convert the captured video data into video data with a bit rate that enables transmission at the allocated communication speed, and transmit the converted video data, or may stop transmission of the video data.

Moreover, as described above, when the video data is used for preventing occurrence of a dead angle, only some area of the capturing areas in the captured video data is likely to be needed for filling the dead angle. In this case, camera ex102 may generate extracted video data by extracting at least only the area needed for preventing occurrence of the dead angle from the video data, and transmit the generated extracted video data to video information processing apparatus ex101. This configuration can realize suppression of occurrence of the dead angle at a narrower communication bandwidth.

Moreover, for example, when superimposed display or video distribution of the additional information is performed, camera ex102 needs to transmit the positional information and information of the capturing direction of camera ex102 to video information processing apparatus ex101. In this case, camera ex102 to which only the bandwidth insufficient for transmitting the video data is allocated may transmit only the positional information and information of the capturing direction detected by camera ex102. Moreover, when video information processing apparatus ex101 estimates the positional information and information of the capturing direction of camera ex102, camera ex102 may convert the captured video data into video data with resolution necessary for estimation of the positional information and the information of the capturing direction, and transmit the converted video data to video information processing apparatus ex101. This configuration can also provide superimposed display or video distribution services of the additional information to camera ex102 to which only the narrow communication bandwidth is allocated. Moreover, since video information processing apparatus ex101 can acquire information of the capturing area from more cameras ex102, video information processing apparatus ex101 is effective, for example, for using information of the capturing area for a purpose of detecting an area that attracts attention, or the like.

Note that the above-described switching of transmission processing of the video data according to the allocated communication bandwidth may be performed by camera ex102 based on the notified communication bandwidth, or video information processing apparatus ex101 may determine the operation of each camera ex102 and notify each camera ex102 of a control signal that indicates the determined operation. This enables appropriate sharing of tasks of processing according to an amount of calculation necessary for determination of switching of the operations, throughput of camera ex102, required communication bandwidth, and the like.

Variation 9

Analyzer ex112 may determine the importance of the video data based on the visual field information (and/or viewpoint information) transmitted from video reception apparatus ex103. For example, analyzer ex112 sets high importance of the captured video data including a lot of areas indicated by the visual field information (and/or viewpoint information). Moreover, analyzer ex112 may determine the importance of the video data in consideration of the number of persons or the number of moving objects in the video. Note that the method for determining the importance is not limited thereto.

Note that a communication control method described in the present exemplary embodiment does not necessarily need to be used in a system that reconstructs the three-dimensional shape from the plurality of pieces of video data. For example, when video data is transmitted by wired communication and/or wireless communication selectively or at a different transmission speed in an environment where there exists a plurality of cameras ex102, the communication control method described in the present exemplary embodiment is effective.

Variation 10

In the video distribution system, video information processing apparatus ex101 may transmit an outline video that indicates an entire capturing scene to video reception apparatus ex103.

Specifically, when video information processing apparatus ex101 has received a distribution request transmitted from video reception apparatus ex103, video information processing apparatus ex101 reads the outline video of an inside of the entire facility or an inside of the entire stadium from storage ex111, and transmits the outline video to video reception apparatus ex103. This outline video may have a long update interval (may have a low frame rate), and may have low image quality. A viewer touches a portion to watch in the outline video displayed on a screen of video reception apparatus ex103. Accordingly, video reception apparatus ex103 transmits the visual field information (and/or viewpoint information) corresponding to the touched portion to video information processing apparatus ex101.

Video information processing apparatus ex101 reads the video data corresponding to the visual field information (and/or viewpoint information) from storage ex111, and transmits the video data to video reception apparatus ex103.

Moreover, analyzer ex112 generates the free viewpoint video by preferentially restoring the three-dimensional shape (three-dimensional reconfiguration) of the area indicated by the visual field information (and/or viewpoint information). Analyzer ex112 restores the three-dimensional shape of an inside of the entire facility or an inside of the entire stadium with accuracy in the extent of indicating the outline. Accordingly, video information processing apparatus ex101 can efficiently restore the three-dimensional shape. As a result, a high frame rate and high image quality of the free viewpoint video of the area the viewer wants to watch can be implemented.

Variation 11

Note that video information processing apparatus ex101 may store in advance as a previous video, for example, three-dimensional shape restored data of the facility or stadium generated in advance from design drawings or the like. Note that the previous video is not limited thereto, but may be virtual space data in which unevenness of space obtained from a depth sensor and a picture derived from a past image or video data or an image or video data at a time of calibration are mapped for each object.

For example, when soccer is played in a stadium, analyzer ex112 may restore only the three-dimensional shapes of players and a ball, and generate the free viewpoint video by combining the obtained restored data and the previous video. Alternatively, analyzer ex112 may preferentially restore the three-dimensional shapes of players and a ball. Accordingly, video information processing apparatus ex101 can restore the three-dimensional shape efficiently. As a result, a high frame rate and high image quality of the free viewpoint video regarding players and a ball to which viewers pay attention can be implemented. Moreover, in the monitoring system, analyzer ex112 may preferentially restore only the three-dimensional shapes of persons and moving objects.

Variation 12

Time of each apparatus may be calibrated when capturing starts, based on information such as reference time of the server. Analyzer ex112 restores the three-dimensional shape by using the plurality of pieces of video data captured at time within a preset time range among the plurality of pieces of captured video data captured by the plurality of cameras ex102 in accordance with accuracy of time settings. This detection of time uses, for example, time when the captured video data is stored in storage ex111. Note that the method for detecting time is not limited thereto. Accordingly, since video information processing apparatus ex101 can restore the three-dimensional shape efficiently, a high frame rate and high image quality of the free viewpoint video can be implemented.

Alternatively, analyzer ex112 may restore the three-dimensional shape by using only high-quality data, or by preferentially using high-quality data among the plurality of pieces of video data stored in storage ex111.

Variation 13

Analyzer ex112 may restore the three-dimensional shape by using camera attribute information. In this case, camera ex102 transmits the captured video data and the camera attribute information to video information processing apparatus ex101. Examples of the camera attribute information include a capturing position, a capturing angle, capturing time, and zoom magnification.

Accordingly, since video information processing apparatus ex101 can restore the three-dimensional shape efficiently, a high frame rate and high image quality of the free viewpoint video can be implemented.

Specifically, camera ex102 defines three-dimensional coordinates in the facility or in the stadium, and transmits to video information processing apparatus ex101 information as camera attribute information that indicates an angle, zoom magnification, and time of capturing of certain coordinates by camera ex102, together with the video. Moreover, when camera ex102 is activated, a clock on a communication network in the facility or in the stadium is synchronized with a clock in the camera, and time information is generated.

Figure 18:
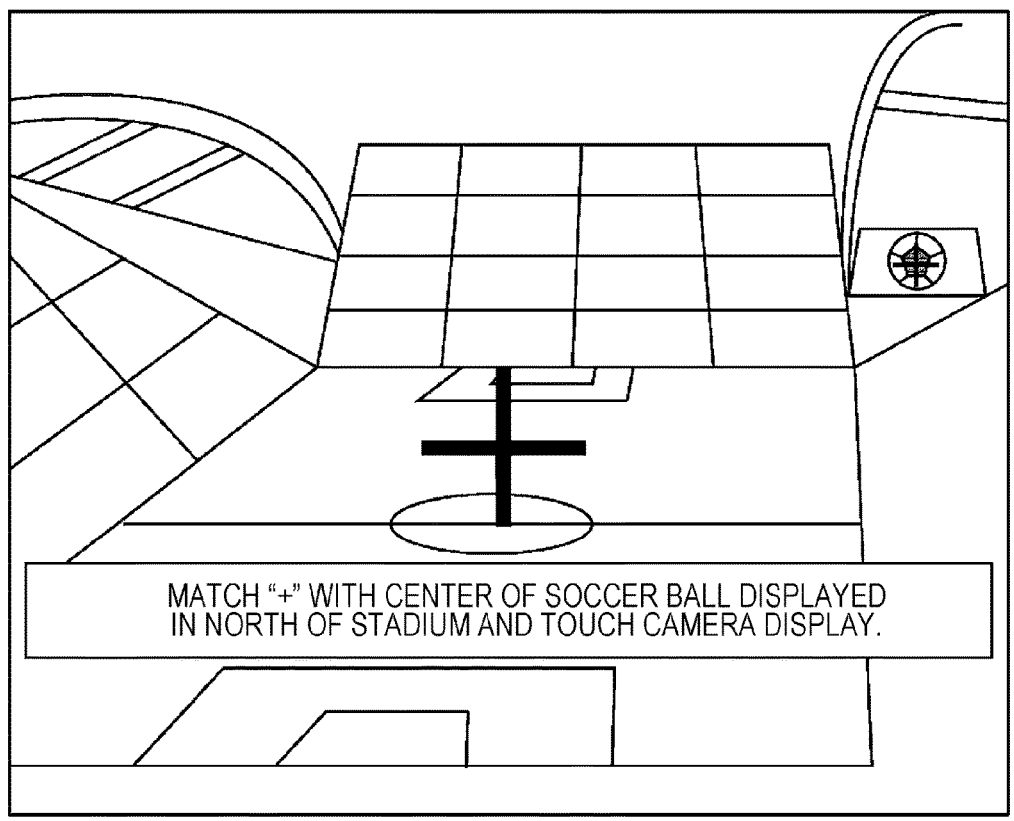
FIG. 18 is a diagram illustrating an example of a notification screen displayed when a camera is activated.

Moreover, the positional and angle information of camera ex102 is acquired by pointing camera ex102 at a specific point in the facility or in the stadium when camera ex102 is activated or at any timing. FIG. 18 is a diagram illustrating an example of notification displayed on a screen of camera ex102 when camera ex102 is activated. When the user matches "+" displayed in a center of the screen with "+" which is in a center of a soccer ball in advertisement in north of the stadium in response to this notification and touches the display of camera ex102, camera ex102 acquires vector information from camera ex102 to the advertisement, and identifies reference of the camera position and angle. Subsequently, camera coordinates and an angle at each time are identified from motion information of camera ex102. Of course, the display is not limited thereto, and display that instructs coordinates, an angle, or a movement speed of the capturing area during a capturing period by using an arrow or the like may be used.

The coordinates of camera ex102 may be identified by using a radio wave of the global positioning system (GPS), wireless fidelity (WiFi) (registered trademark), third generation (3G), long term evolution (LTE), and fifth generation (5G) (wireless LAN), or by using the near field communication such as beacon (Bluetooth (registered trademark), ultrasonic waves). Moreover, information about which base station in the facility or in the stadium has received the captured video data may be used.

Variation 14

The system may be provided as an application that operates on a mobile terminal such as a smartphone.

Accounts of various social networking services (SNS) or the like may be used for login to the system. Note that an account dedicated to an app or a guest account that has limited functions may be used. Favorite videos, favorite accounts or the like can be evaluated by using the accounts in such a manner. Moreover, the bandwidth is preferentially allocated to, for example, video data similar to video data that is being captured or viewed, or to video data of the viewpoint similar to the viewpoint of video data that is being captured or viewed, and this can increase resolution of these pieces of video data. Accordingly, the three-dimensional shape from these viewpoints can be restored with better accuracy.

Moreover, the user can preferentially watch the selected image over other users by selecting a favorite image video and by following the other party with the application, or the user can have connection by text chatting or the like on condition of approval of the other party. Thus, it is possible to generate a new community.

Thus, connection between the users in the community can activate capturing itself or sharing of captured images, and can prompt restoration of three-dimensional shapes with higher accuracy.

Moreover, according to settings of connection in the community, the user can edit images or videos captured by another person, or can perform collage of an image of another person and an image of the user to create a new image or video. This enables sharing of a new video work, such as sharing the new image or video only with persons in the community. Moreover, the video work can also be used for a game of augmented reality or the like by inserting a computer-graphics (CG) character in this editing.

Moreover, since the system enables sequential output of three-dimensional model data, a 3D printer or the like that the facility has can output a three-dimensional object, based on the three-dimensional model data in a characteristic scene such as a goal scene. This also enables sale after the game of an object based on the scene during the game as a souvenir such as a key ring, or distribution after the game of such an object to participating users. Of course, this also enables printing of an image captured from the best viewpoint as an ordinary photograph.

Variation 15

A center connected to the system can used the above-described system to manage a rough state of the overall region, for example, from a video of a vehicle-mounted camera of the police and a wearable camera of a police officer, and the like.

During ordinary patrol, still images are transmitted and received, for example, every several minutes. Moreover, the center identifies a region in which crime is highly likely to occur, based on a criminal map prepared based on a result of analysis using past criminal data or the like. Alternatively, the center keeps regional data related to a crime rate identified in this manner. In a region with the identified high-crime-rate, high frequency of transmission and reception of images may be set, or a change of images to moving images may be made. Moreover, when an incident occurs, moving images or three-dimensional reconfiguration data using SfM may be used. Moreover, the center or each terminal can compensate the image or virtual space by simultaneously using information from other sensors such as a depth sensor and a thermal sensor, and accordingly the police officer can understand the situation with better accuracy.

Moreover, the center can used the three-dimensional reconfiguration data to feed back information of the object to the plurality of terminals. This enables each individual person having a terminal to keep track of the object.

Moreover, in these years, capturing has been performed from the air by an apparatus that can fly such as a quadcopter and a drone, for purposes of investigation of buildings or environment, capturing with realism such as sports or the like. While blur of images is likely to become a problem in capturing by such an autonomous moving apparatus, SfM can create three dimensions while compensating the blur with a position and an inclination. This can realize improvement in image quality and improvement in restoration accuracy of space.

Moreover, installation of a vehicle-mounted camera that captures an outside of a car is mandatory in some countries. In such a vehicle-mounted camera weather and a road surface state in a direction of a destination, traffic congestion level and the like can be understood with better accuracy by using three-dimensional data modeled from a plurality of images.

Third Exemplary Embodiment

The processing described in each of the above-described exemplary embodiments can be carried out easily in a standalone computer system by recording a program for implementing the configuration of the image processing method described in each exemplary embodiment on a storage medium. The storage medium may be any type of medium capable of storing the program, such as a magnetic disk, an optical disc, a magneto-optical disk, an integrated circuit (IC) card, and a semiconductor memory.

Here, application examples of the image processing method described in each of the exemplary embodiments and the systems using the application examples will be further described. The systems include an apparatus that uses the image processing method. A change in other configurations of the systems can be made appropriately in accordance with the circumstances.

Figure 19:
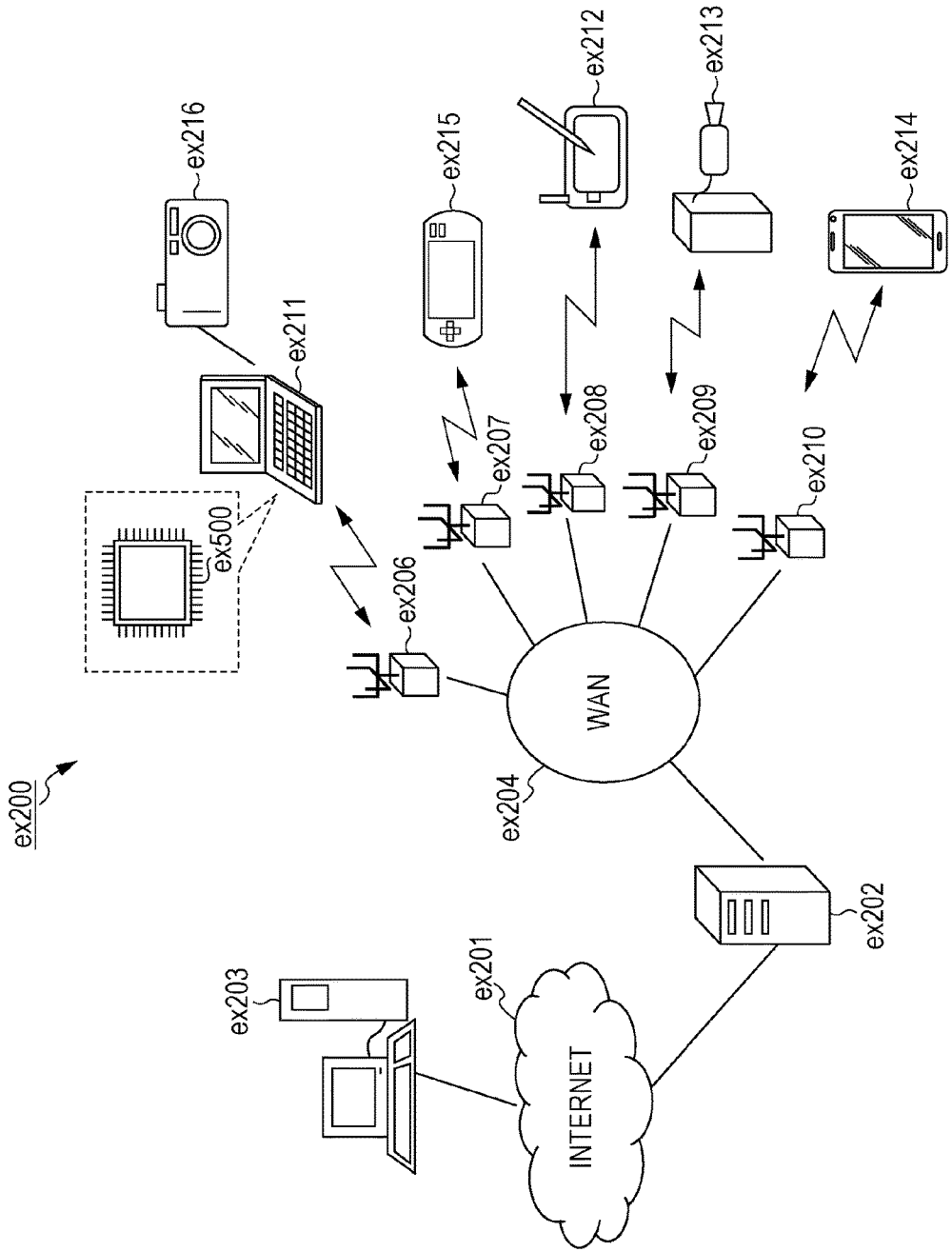
FIG. 19 is an overall configuration diagram of a content providing system that implements content distribution services.

FIG. 19 is a diagram illustrating an overall configuration of content providing system ex200 that implements content distribution services. An area in which communication services are provided is divided with a desired size. Base stations ex206, ex207, ex208, ex209, and ex210 which are fixed wireless stations are installed in respective cells.

In content providing system ex200, various devices such as computer ex211, personal digital assistant (PDA) ex212, camera ex213, smartphone ex214, and game machine ex215 are connected to Internet ex201 via Internet service provider ex202, wide area network (WAN) ex204, and base stations ex206 to ex210.

However, the configuration of content providing system ex200 is not limited to the configuration illustrated in FIG. 19, and any elements may be combined and connected. Moreover, each device may be connected directly to telephone lines, cable TV, or WAN ex204 such as optical communication, instead of via base stations ex206 to ex210 which are fixed wireless stations. Alternatively, each device may be interconnected directly via near field communication or the like.

Camera ex213 is a device capable of capturing moving images, such as a digital camcorder. Camera ex216 is a device capable of capturing still images and moving images, such as a digital camera. Moreover, smartphone ex214 is, for example, a smartphone conforming to a global system for mobile communication (GSM) (registered trademark) scheme, a code division multiple access (CDMA) scheme, a wideband-code division multiple access (W-CDMA) scheme, an long term evolution (LTE) scheme, an high speed packet access (HSPA) scheme, or a communication scheme using high-frequency bands, or a personal handy-phone system (PHS), and smartphone ex214 may be any of them.

In content providing system ex200, camera ex213 or the like is connected to streaming server ex203 via base station ex209 and WAN ex204. Accordingly, live streaming or the like becomes possible. In the live streaming, coding processing is performed on content (for example, a video of a music event) captured by the user using camera ex213 and the resulting content is transmitted to streaming server ex203. Meanwhile, streaming server ex203 perform stream distribution of content data transmitted to a client that has made a request. Examples of the client include computer ex211, PDA ex212, camera ex213, smartphone ex214, and game machine ex215 capable of decoding the data that has undergone the coding processing. Each device that has received the distributed data performs decoding processing on the received data to reproduce the data.

Note that the coding processing of the captured video may be performed by camera ex213, or may be performed by streaming server ex203 that performs data transmission processing, or camera ex213 and streaming server ex203 may share tasks of the coding processing of the captured video with each other. Similarly, the decoding processing of the distributed data may be performed by the client, or may be performed by streaming server ex203, or the client and streaming server ex203 may share tasks of the decoding processing of the captured video with each other. Moreover, in addition to still and/or moving image data captured by camera ex213, still and/or moving image data captured by camera ex216 may be transmitted to streaming server ex203 via computer ex211. In this case, the coding processing may be performed by any of camera ex216, computer ex211, and streaming server ex203, or camera ex216, computer ex211, and streaming server ex203 may share tasks of the coding processing with each other. Further, regarding display of the decoded image, a plurality of devices connected to the system may cooperate to display an identical image, or a device having a large display unit may display the entire image and a device such as smartphone ex214 may enlarge and display some area of the image.

Moreover, the coding processing and the decoding processing are performed in general by LSI ex500 in computer ex211 or each device. LSI ex500 may be formed as a single chip or a plurality of chips. Note that software for coding/decoding a moving image may be recorded on any recording medium (such as a CD-ROM, a flexible disk, and a hard disk) that is readable by computer ex211 or the like, and the coding processing and the decoding processing may be performed using the software. Further, in the case where smartphone ex214 is equipped with a camera, moving image data acquired by the camera may be transmitted. This moving image data is data that has been coded by LSI ex500 in smartphone ex214.

Moreover, streaming server ex203 may be a plurality of servers or a plurality of computers that processes, records, and distributes data.

In the above-described manner, content providing system ex200 enables the client to receive and reproduce coded data. Thus, content providing system ex200 enables the client to receive, decode, and reproduce in real time information transmitted by a user, and enables even a user having no special right or equipment to implement personal broadcasting.

Figure 20:
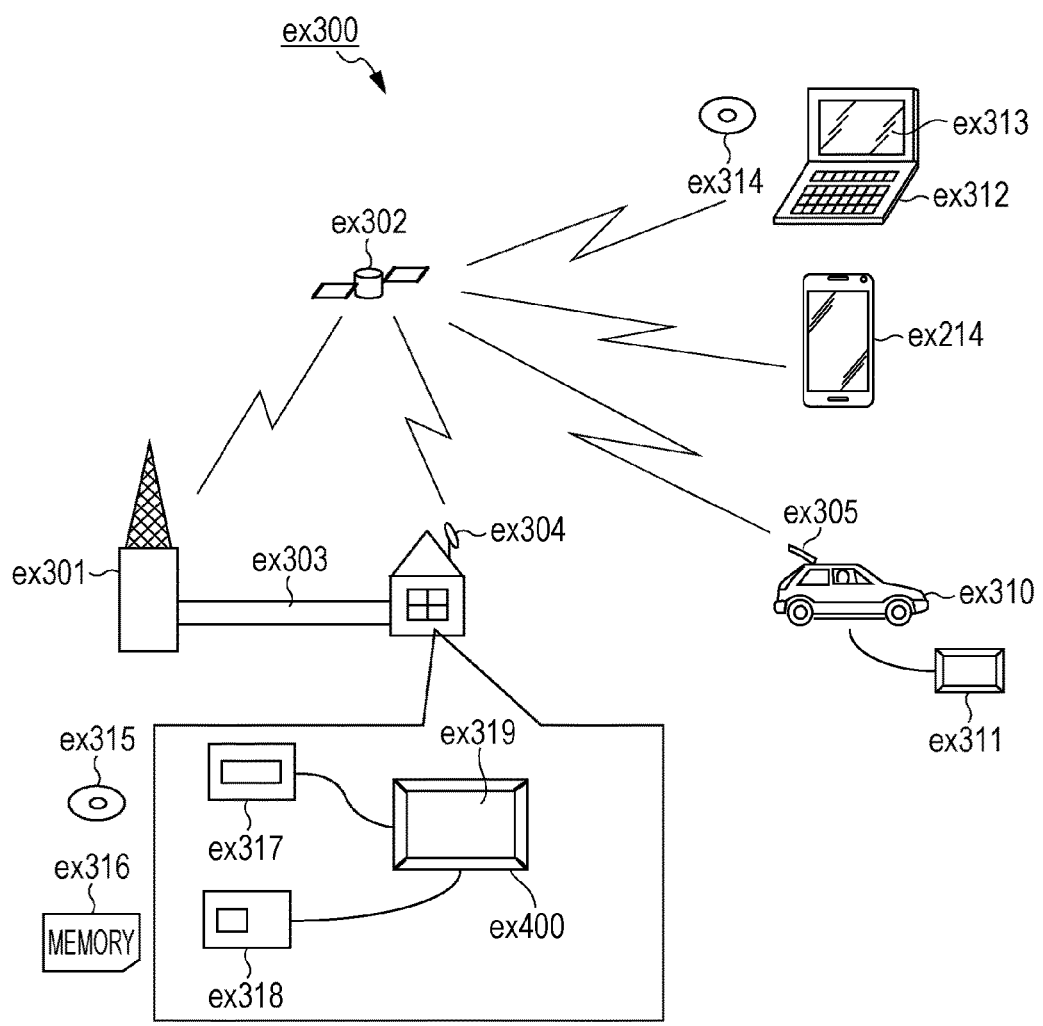
FIG. 20 is an overall configuration diagram of a digital broadcasting system.

Note that in addition to the example of content providing system ex200, each of the above-described exemplary embodiments may also be applied to digital broadcasting system ex300, as illustrated in FIG. 20. Specifically, broadcasting station ex301 transmits a radio wave of multiplexed data obtained by multiplexing video data with music data or the like via communication to broadcasting satellite ex302. This video data is data coded by the moving image coding method described in each of the above-described exemplary embodiments. Broadcasting satellite ex302 that has received this data transmits a broadcasting radio wave, and home antenna ex304 capable of receiving satellite broadcasting receives this radio wave. An apparatus such as television (receiver) ex400 or set top box (STB) ex317 decodes and reproduces the received multiplexed data.

Moreover, the moving image decoding apparatus or the moving image coding apparatus described in each of the above-described exemplary embodiments can be implemented in reader/recorder ex318 that reads and decodes the multiplexed data recorded on recording medium ex315 such as a digital versatile disc (DVD) and a blu-ray disc (BD) or memory ex316 such as an secured digital (SD), or that codes a video signal and further multiplexes the video signal with a music signal depending on circumstances, and writes the resulting signal on recording medium ex315 or memory ex316. In this case, monitor ex319 may display the reproduced video signal, and another apparatus or system can reproduce the video signal by using recording medium ex315 or memory ex316 having the multiplexed data recorded thereon. Moreover, the moving image decoding apparatus may be implemented in set top box ex317 connected to cable ex303 for a community antenna television system (CATV) or antenna ex304 for satellite/terrestrial broadcasting, and monitor ex319 of the television may display the video signal. At this time, the moving image decoding apparatus may be incorporated into the television instead of the set top box.

Figure 21:
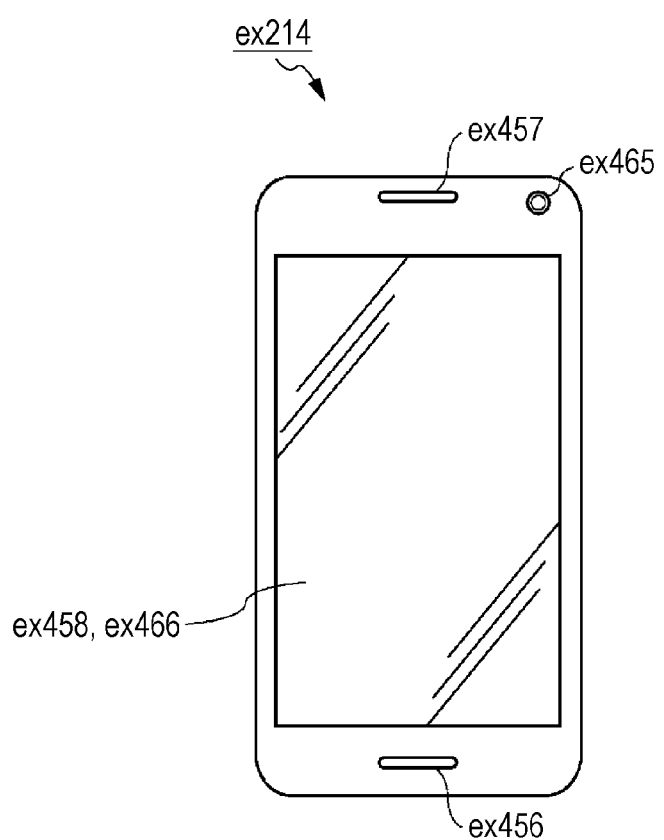
FIG. 21 is a diagram illustrating an example of a smartphone.
Figure 22:
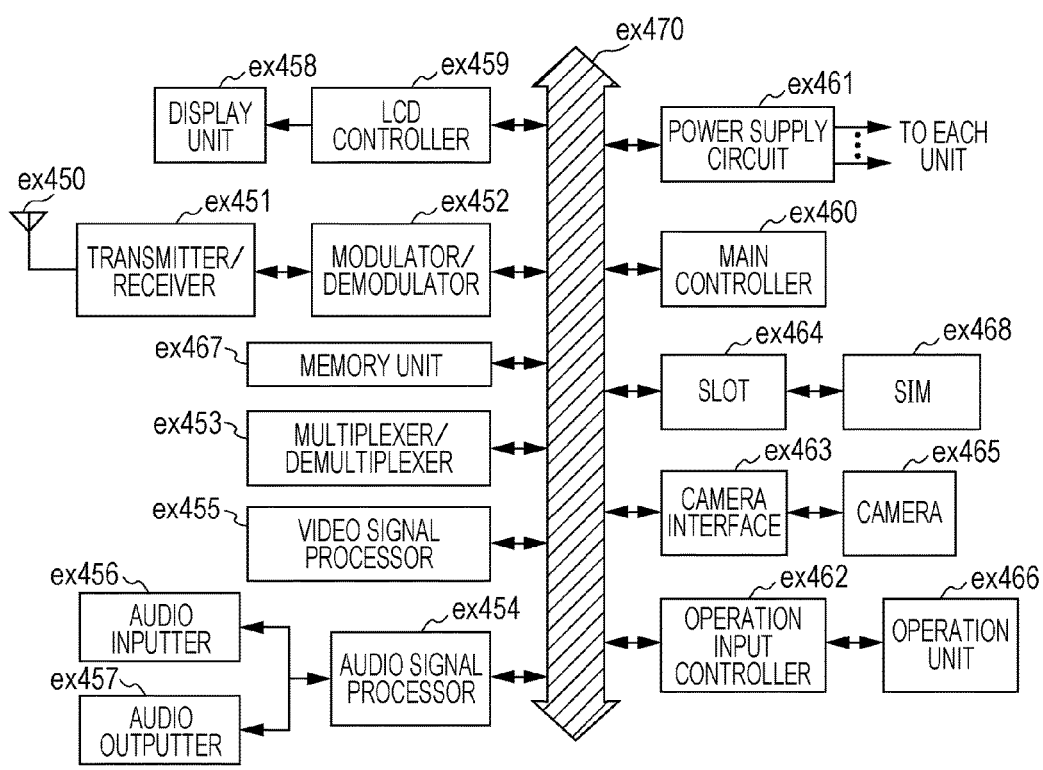
FIG. 22 is a block diagram illustrating a configuration example of a smartphone.

FIG. 21 is a diagram illustrating smartphone ex214. Moreover, FIG. 22 is a diagram illustrating a configuration example of smartphone ex214. Smartphone ex214 includes antenna ex450 that transmits and receives a radio wave to and from base station ex210, camera ex465 capable of capturing a video and a still image, and display unit ex458 such as a liquid crystal display that displays the video captured by camera ex465 and data obtained by decoding a video or the like received on antenna ex450. Smartphone ex214 further includes operation unit ex466 which is a touch panel or the like, audio outputter ex457 such as a speaker for outputting audio, audio inputter ex456 such as a microphone for inputting audio, memory unit ex467 capable of storing coded data or decoded data of a captured video, a captured still image, recorded audio, a received video, a received still image, or a received email, memory ex316 illustrated in FIG. 20, or slot ex464 which is an interface to SIM ex468 for identifying a user and for authentication of access to various types of data including a network.

In smartphone ex214, power supply circuit ex461, operation input controller ex462, video signal processor ex455, camera interface ex463, liquid crystal display (LCD) controller ex459, modulator/demodulator ex452, multiplexer/demultiplexer ex453, audio signal processor ex454, slot ex464, and memory unit ex467 are connected via bus ex470 to main controller ex460 that comprehensively controls display unit ex458, operation unit ex466 and the like, respectively.

When an on-hook/power key is turned on by a user operation, power supply circuit ex461 supplies electric power to each unit from a battery pack, and accordingly activates smartphone ex214 into an operable state.

In smartphone ex214 based on control of main controller ex460 that includes a CPU, a ROM, a RAM and the like, audio signal processor ex454 converts an audio signal recorded with audio inputter ex456 in a voice call mode into a digital audio signal, and modulator/demodulator ex452 performs spread spectrum processing on this digital audio signal, and transmitter/receiver ex451 performs digital-to-analog conversion processing and frequency conversion processing on this signal and then transmits the resulting signal via antenna ex450. Moreover, smartphone ex214, amplifies reception data received via antenna ex450 in the voice call mode and performs frequency conversion processing and analog-to-digital conversion processing on the data, and modulator/demodulator ex452 performs spread spectrum processing on the resulting signal, and audio signal processor ex454 converts the resulting signal into an analog audio signal, and then audio outputter ex457 outputs the analog audio signal.

In the case where an email is transmitted in a data communication mode, text data of the email input by operation of operation unit ex466 or the like of a body is sent to main controller ex460 via operation input controller ex462. In main controller ex460 modulator/demodulator ex452 performs spread spectrum processing on the text data, and transmitter/receiver ex451 performs digital-to-analog conversion processing and frequency conversion processing on the text data and then transmits the resulting text data to base station ex210 via antenna ex450. In the case of receiving an email, substantially the opposite processing is performed on the received data, and the resulting data is output to display unit ex458.

In the case where a video, a still image, or a combination of a video and audio are transmitted in the data communication mode, video signal processor ex455 compresses and codes a video signal supplied from camera ex465 by the moving image coding method described in each of the above exemplary embodiments, and sends the coded video data to multiplexer/demultiplexer ex453. Moreover, audio signal processor ex454 codes an audio signal recorded with audio inputter ex456 while the video, the still image, or the like is being captured by camera ex465, and sends the coded audio data to multiplexer/demultiplexer ex453.

Multiplexer/demultiplexer ex453 multiplexes the coded video data supplied from video signal processor ex455 and the coded audio data supplied from audio signal processor ex454 by a predetermined scheme. Modulator/demodulator (modulation/demodulation circuit) ex452 performs spread spectrum processing on the resulting multiplexed data. Transmitter/receiver ex451 performs digital-to-analog conversion processing and frequency conversion processing on the multiplexed data, and then transmits the resulting data via antenna ex450.

In the case of receiving data of a moving image file linked to a website or the like in the data communication mode, or in the case of receiving an email having a video or audio attached thereto, multiplexer/demultiplexer ex453 demultiplexes multiplexed data into a bitstream of video data and a bitstream of audio data in order to decode the multiplexed data received via antenna ex450. Multiplexer/demultiplexer ex453 supplies the coded video data to video signal processor ex455 and the coded audio data to audio signal processor ex454 via synchronization bus ex470. Video signal processor ex455 decodes the video signal by a moving image decoding method corresponding to the moving image coding method described in each of the above exemplary embodiments. Display unit ex458 displays via LCD controller ex459 a video or still image in the moving image file linked to the website. Moreover, audio signal processor ex454 decodes the audio signal, and audio outputter ex457 outputs audio.

Moreover, like television ex400, three implementation forms of a terminal such as smartphone ex214, that is, a transmission/reception terminal including both an encoder and a decoder, a transmission terminal including only an encoder, and a reception terminal including only a decoder, are conceivable. Further, digital broadcasting system ex300 in which multiplexed data obtained by multiplexing video data with music data or the like is received and transmitted is described above; however, the multiplexed data may be data obtained by multiplexing text data or the like related to the video other than audio data, or may be video data as is instead of the multiplexed data.

Moreover, the present disclosure is not limited to the above-described exemplary embodiments, and various variations or modifications can be made without departing from the scope of the present disclosure.

The present disclosure is applicable to a video distribution system that distributes videos captured by a plurality of cameras.

What is claimed is:

1. A method comprising:
    distributing, from a server to a terminal apparatus, a first video that is one of a plurality of videos captured by a plurality of users from different viewpoints and that is requested by the terminal apparatus,
    selecting a second video that is one of the plurality of videos and that is likely to be requested next by the terminal apparatus; and
    starting transmission of the second video to the terminal apparatus during the distributing of the first video to the terminal apparatus,
    wherein the second video is transmitted (i) after starting the distributing of the first video and (ii) in parallel with the distributing of the first video,
    wherein the selecting includes determining whether or not a resolution of each of the plurality of videos is the same as or is approximate to a resolution of the first video, the second video being selected when a resolution of the second video is determined to be the same as or to be approximate to a resolution of the first video, in the determining.

2. The method according to claim 1, wherein in the selecting, the one of the plurality of videos that is selected as the second video that is likely to be requested, is a video with a high degree of relevance to the first video.

3. The method according to claim 2, wherein in the selecting, the degree of relevance is determined to be high when a position of a capturing scene of the second video is close to a position of a capturing scene of the first video.

4. The method according to claim 3, wherein in the selecting, the degree of relevance is further determined to be high when a size of the capturing scene of the second video is close to a size of the capturing scene of the first video.

5. The method according to claim 2, wherein in the selecting, the degree of relevance of one of the videos is determined to be high when a subject identical to a subject in the first video is captured.

6. The method according to claim 1, wherein the selecting includes determining whether a frame rate of each of the plurality of videos is a same as or is approximate to a frame rate of the first video, the second video being selected when a frame rate of the second video is determined to be the same or to be approximate to the frame rate of the first video, in the determining.

7. The method according to claim 1, wherein in the selecting, the one of the plurality of videos that is selected as likely to be requested, is a video that is selected many times by another user.

8. The method according to claim 1, wherein in the selecting, the second video that is likely to be requested is selected based on a viewing history or previously registered taste information of each of the users of the terminal apparatus.

9. The method according to claim 1, wherein the selecting includes determining whether or not a bit rate of each of the plurality of videos is a same as or is approximate to a bit rate of the first video, the second video being selected when the bit rate of the second video is determined to be the same as or to be approximate to the bit rate of the first video, in the determining.

10. The method according to claim 1, wherein in the displaying, one of the plurality of icons that indicates the position of the viewpoint of the second video is bigger than the other icons.

11. A method comprising:
    selecting a first video from a plurality of videos captured from a plurality of viewpoints;
    requesting a server to transmit the first video;
    receiving the first video from the server;
    displaying the first video; and
    starting reception of a second video, that is one of the plurality of videos, and that is likely to be selected next for viewing, during the receiving of the first video,
    wherein the second video is received (i) after starting receiving the first video and (ii) in parallel with receiving the first video, and
    wherein the selecting includes determining whether or not a resolution of each of the plurality of videos is the same as or is approximate to a resolution of the first video, the second video being selected when a resolution of the second video is determined to be the same as or to be approximate to a resolution of the first video, in the determining.

12. The method according to claim 11, comprising:
    accumulating the received second video; and
    displaying the accumulated second video when the second video is selected during display of the first video.

13. The method according to claim 12, comprising:
    receiving, from the server, a third video different from the first video and the second video, when the third video is selected during displaying of the first video; and
    displaying the accumulated second video until reception of the third video.

14. The method according to claim 11, wherein in the displaying, an image that overlooks a place in which the plurality of videos is captured and that includes a plurality of icons which indicate positions of the plurality of viewpoints is further displayed.

15. The method according to claim 14, wherein in the displaying, each of the plurality of icons that indicates the position of the viewpoint of the second video is highlighted.

16. The method according to claim 15, wherein in the displaying, a shape of one of the plurality of icons that indicates the position of the viewpoint of the second video is thicker than the other icons.

17. The method according to claim 15, wherein in the displaying, a color of one of the plurality of icons that indicates the position of the viewpoint of the second video is different than a color of the other icons.

18. A server comprising:
a processor; and
a memory having a computer program stored thereon, the computer program causing the processor to execute operations including:
distributing, to a terminal apparatus, a first video that is one of a plurality of videos captured by a plurality of users from different viewpoints and that is specified by the terminal apparatus;
selecting a second video that is one of the plurality of videos and that is likely to be requested next for viewing by the terminal apparatus; and
starting transmission of the second video to the terminal apparatus during distribution of the first video to the terminal apparatus,
wherein the second video is transmitted (i) after starting the distributing of the first video and (ii) in parallel with the distributing of the first video, and
wherein the selecting includes determining whether or not a resolution of each of the plurality of videos is the same as or is approximate to a resolution of the first video, the second video being selected when a resolution of the second video is determined to be the same as or to be approximate to a resolution of the first video, in the determining.

19. A terminal apparatus for receiving, from a server, any one of a plurality of videos and for displaying the received video, the terminal apparatus comprising:
a processor; and
a memory having a computer program stored thereon, the computer program causing the processor to execute operations including:
selecting a first video from a plurality of videos, captured from a plurality of viewpoints;
requesting the server to transmit the first video;
receiving the first video from the server;
displaying the first video; and
starting reception of a second video, that is one of the plurality of videos and that is likely to be selected next for viewing, during receiving of the first video,
wherein the second video is received (i) after starting the receiving of the first video and (ii) in parallel with the receiving of the first video, and
wherein the selecting includes determining whether or not a resolution of each of the plurality of videos is the same as or is approximate to a resolution of the first video, the second video being selected when a resolution of the second video is determined to be the same as or to be approximate to a resolution of the first video, in the determining.

20. A video distribution system comprising:
a server comprising:
a processor; and
a memory having a computer program stored thereon, the computer program causing the processor to execute operations including:
distributing, to a terminal apparatus, a first video that is one of a plurality of videos captured by a plurality of users from different viewpoints and that is specified by the terminal apparatus;
selecting a second video that is one of the plurality of videos and that is likely to be next specified and requested for viewing by the terminal apparatus; and
starting transmission of the second video to the terminal apparatus during distributing of the first video to the terminal apparatus;
wherein the second video is transmitted (i) after starting the distributing of the first video and (ii) in parallel with the distributing of the first video; and
the terminal apparatus according to claim 19.

21. A non-transitory recording medium having a computer program stored thereon, the computer program causing a processor to execute operations comprising:
selecting a first video from a plurality of videos captured from a plurality of viewpoints;
requesting a server to transmit the first video;
receiving the first video from the server;
displaying the first video; and
starting reception of a second video, that is one of the plurality of videos, and that is likely to be selected next for viewing, during receiving of the first video,
wherein the second video is received (i) after starting the receiving of the first video and (ii) in parallel with the receiving of the first video, and
wherein the selecting includes determining whether or not a resolution of each of the plurality of videos is the same as or is approximate to a resolution of the first video, the second video being selected when a resolution of the second video is determined to be the same as or to be approximate to a resolution of the first video, in the determining.

* * * * *